US012761385B2

(12) United States Patent
Laverne et al.

(10) Patent No.: US 12,761,385 B2
(45) Date of Patent: Oct. 13, 2026

(54) GEOLOGIC MODELING FRAMEWORK

(71) Applicant: Schlumberger Technology Corporation, Sugar Land, TX (US)

(72) Inventors: Thomas Laverne, Montpellier (FR); Azeddine Benabbou, Montpellier (FR); Thomas Viard, Montpellier (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 132 days.

(21) Appl. No.: 18/714,791

(22) PCT Filed: Dec. 30, 2022

(86) PCT No.: PCT/US2022/082630
§ 371 (c)(1),
(2) Date: May 30, 2024

(87) PCT Pub. No.: WO2023/130074
PCT Pub. Date: Jul. 6, 2023

(65) Prior Publication Data

US 2025/0044471 A1 Feb. 6, 2025

Related U.S. Application Data

(60) Provisional application No. 63/295,784, filed on Dec. 31, 2021.

(51) Int. Cl.
*G01V 1/30* (2006.01)
*G06T 17/20* (2006.01)

(52) U.S. Cl.
CPC ............ *G01V 1/302* (2013.01); *G06T 17/205* (2013.01); *G01V 2210/642* (2013.01); *G01V 2210/66* (2013.01)

(58) Field of Classification Search
CPC ..... E21B 2200/20; E21B 41/00; G01V 1/302; G01V 20/00; G01V 2210/642; G01V 2210/66; G06T 17/05; G06T 17/20; G06T 17/205
See application file for complete search history.

(56) References Cited

U.S. PATENT DOCUMENTS

2011/0071799 A1 3/2011 Slotte
2012/0026167 A1 2/2012 Ran
(Continued)

FOREIGN PATENT DOCUMENTS

| | | | |
|---|---|---|---|
| CN | 102194253 | | 9/2011 |
| CN | 106934826 | | 7/2017 |
| WO | 2005119304 | A1 | 12/2005 |
| WO | 2019238451 | A1 | 12/2019 |
| WO | 2020214635 | A1 | 10/2020 |

OTHER PUBLICATIONS

Search Report and Written Opinion of International Patent Application No. PCT/US2022/082630 dated Apr. 4, 2023, 9 pages.
(Continued)

*Primary Examiner* — Ming Wu
(74) *Attorney, Agent, or Firm* — Kyle R. Miiller

(57) ABSTRACT

A method can include embedding a discontinuity as an object in a three-dimensional hexahedral grid that includes hexahedral cells and represents a geologic environment; cutting a number of the hexahedral cells by intersecting the object and the three-dimensional hexahedral grid to identify cut cells; constructing a topological three-dimensional hexahedral grid using a topology for the cut cells that includes spatially overlapping hexahedral cells and associated cut cell-face links; and generating results that characterize the geologic environment with the discontinuity using a system of equations that represent the geologic environment and the topological three-dimensional hexahedral grid.

20 Claims, 13 Drawing Sheets

(56) References Cited

U.S. PATENT DOCUMENTS

| | | | | |
|---|---|---|---|---|
| 2015/0066460 | A1* | 3/2015 | Klinger | G01V 1/302 703/2 |
| 2017/0321543 | A1 | 11/2017 | Plateaux | |
| 2018/0031720 | A1* | 2/2018 | Etiene Queiroz | G01V 1/48 |
| 2019/0302309 | A1* | 10/2019 | Li | G01V 1/325 |
| 2021/0247543 | A1* | 8/2021 | Frank | G01V 1/282 |

OTHER PUBLICATIONS

Tao, M. et al., "Mandoline: Robust Cut-Cell Generation for Arbitrary Triangle Meshes", Article 179, ACM Transactions on Graphics, 2019, 38(6), 17 pages.
Mitchell, N. et al., "Non-manifold Level Sets: A multivalued implicit surface representation with applications to self-collision processing", 2015, University of Wisconsin—Madison, downloaded from the internet on Mar. 25, 2024 at [https://pages.cs.wisc.edu/~sifakis/papers/nonmanifold_levelsets.pdf], 9 pages.
Slotnick, j. et al., "NASAs CFD Vision 2030 Study. A Path to Revolutionary Computational Aerosciences", NASA/CR-2014-218178, 2014, downloaded from the internet on Mar. 25, 2024 at [https://ntrs.nasa.gov/api/citations/20140003093/downloads/20140003093.pdf], 58 pages.
Sifakis, E et al., "Arbitrary Cutting of Deformable Tetrahedralized Objects", Eurographics/ACM SIGGRAPH Symposium on Computer Animation, 2007, 8 pages.
Martinez, A. R. et al., "A New Shortcut Workflow in Flexible Reservoir Modeling: Introducing Structural Features without Re-Gridding", SPE-188575-MS, presented at the Abu Dhabi International Petroleum Exhibition Conference, Abu Dhabi, 2017, 8 pages.

* cited by examiner

510

520

530

1000

GEOLOGIC MODELING FRAMEWORK

RELATED APPLICATIONS

This application is a National Stage Entry of International Application No. PCT/US2022/082630, filed Dec. 30, 2022, which claims priority to and the benefit of a US Provisional Application having Ser. No. 63/295,784, filed 31 Dec. 2021, which is incorporated by reference herein in its entirety.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.).

In oil and gas exploration, geoscientists and engineers may acquire and analyze data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.). As an example, a more accurate model of a subsurface region may make a drilling operation more accurate as to a borehole's trajectory where the borehole is to have a trajectory that penetrates a reservoir, etc.

In general, model accuracy and model complexity are related in that a more accurate model tends to be a more complex model. For example, an unstructured model composed of tetrahedral elements of various sizes and shapes can be utilized to model subsurface geologic features such as discontinuities (e.g., consider a fault as a type of discontinuity). While such a model may be relatively accurate, it can increase computational demands, including memory demands. Further, as tetrahedral elements can be of various shapes and sizes, some may be ill-shaped and/or ill-sized and thereby cause computational issues such as, for example, convergence issues. Convergence issues can waste valuable resources and time, particularly where a simulation that aims to generate results may take hours or days to execute using high performance computing resources. For example, a convergence issue can increase the number of iterations required by an iterative computational solver to solve a system of equations to thereby generate a solution. At times, a convergence issue can even confound a solver's ability to arrive at a solution. Given various issues associated with use of unstructured tetrahedral elements for modeling subsurface geologic structures, a need exists for improved elements and techniques for model building, which, in turn, can improve various workflows (e.g., planning, development, field operation, etc.).

SUMMARY

A method can include embedding a discontinuity as an object in a three-dimensional hexahedral grid that includes hexahedral cells and represents a geologic environment; cutting a number of the hexahedral cells by intersecting the object and the three-dimensional hexahedral grid to identify cut cells; constructing a topological three-dimensional hexahedral grid using a topology for the cut cells that includes spatially overlapping hexahedral cells and associated cut cell-face links; and generating results that characterize the geologic environment with the discontinuity using a system of equations that represent the geologic environment and using the topological three-dimensional hexahedral grid.

A system can include one or more processors; a memory accessible to at least one of the one or more processors; processor-executable instructions stored in the memory and executable to instruct the system to: embed a discontinuity as an object in a three-dimensional hexahedral grid that includes hexahedral cells and represents a geologic environment; cut a number of the hexahedral cells by intersecting the object and the three-dimensional hexahedral grid to identify cut cells; construct a topological three-dimensional hexahedral grid using a topology for the cut cells that includes spatially overlapping hexahedral cells and associated cut cell-face links; and generate results that characterize the geologic environment with the discontinuity using a system of equations that represent the geologic environment and using the topological three-dimensional hexahedral grid.

One or more computer-readable storage media can include processor-executable instructions to instruct a computing system to: embed a discontinuity as an object in a three-dimensional hexahedral grid that incudes hexahedral cells and represents a geologic environment; cut a number of the hexahedral cells by intersecting the object and the three-dimensional hexahedral grid to identify cut cells; construct a topological three-dimensional hexahedral grid using a topology for the cut cells that includes spatially overlapping hexahedral cells and associated cut cell-face links; and generate results that characterize the geologic environment with the discontinuity using a system of equations that represent the geologic environment and using the topological three-dimensional hexahedral grid. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
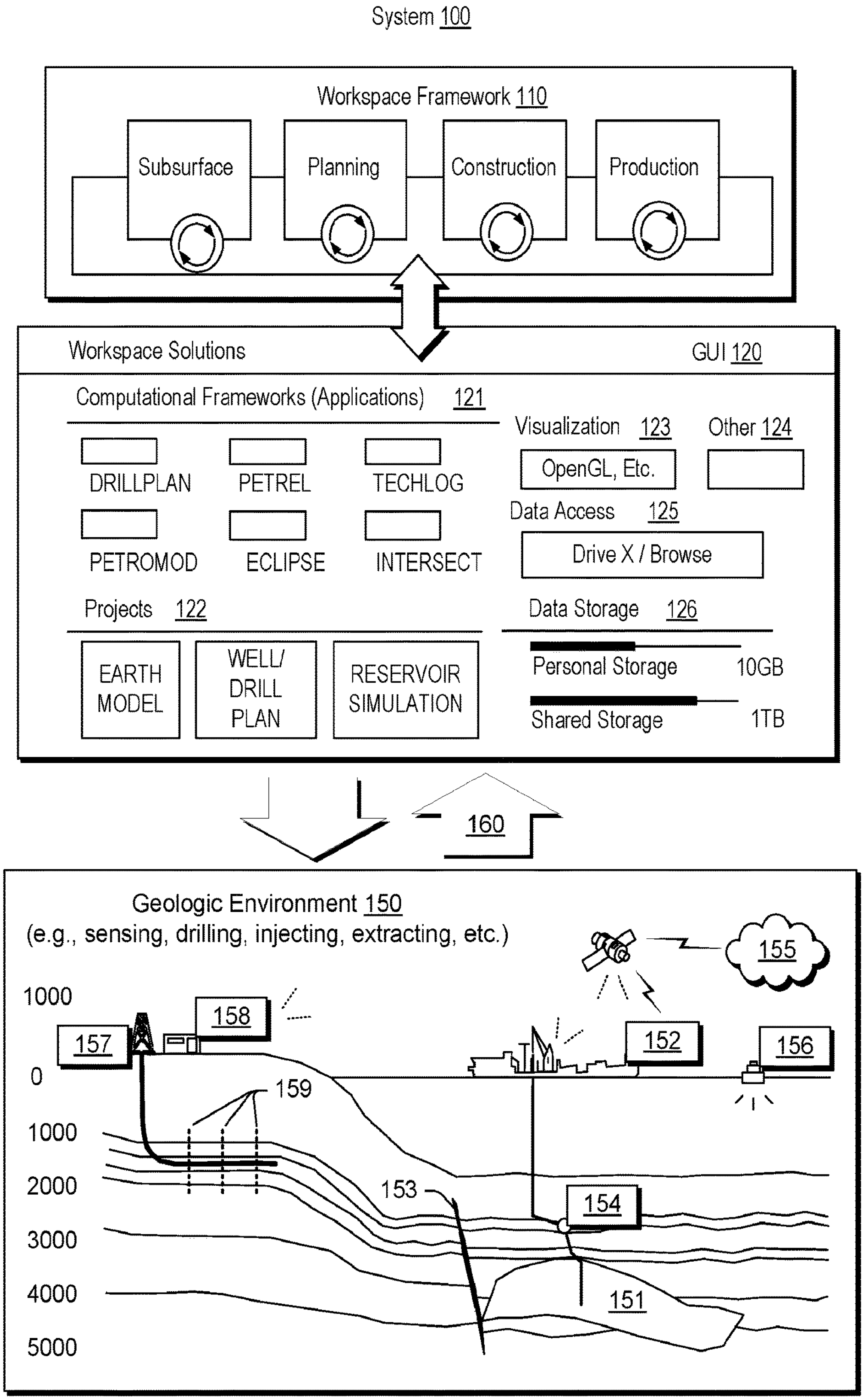
FIG. 1 illustrates an example system that includes various framework components associated with one or more geologic environments.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, and INTERSECT frameworks (SLB, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive E & P environment (SLB, Houston, Texas) for utilization in geosciences and geoengineering, for example, to analyze subsurface data from exploration to production of fluid from a reservoir.

The TECHLOG framework can handle and process field and laboratory data for a variety of geologic environments (e.g., deepwater exploration, shale, etc.). The TECHLOG framework can structure wellbore data for analyses, planning, etc.

The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1D, 2D, 3D, or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

A simulator can be utilized to simulate the exploitation of a real reservoir, for example, to examine different productions scenarios to find an optimal one before production or further production occurs. A reservoir simulator does not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that results in model cell sizes being of the order of meters; rather than a lesser size (e.g., a level of detail of pores). Considering that a model may span a distance or distances in kilometers, a model can include more than one million cells and may include a billion cells or more. For example, consider a model that is 20 km by 20 km and 10 km deep, which is 4,000 cubic kilometers or $4\times10^{12}$ cubic meters. If a cell is 100 m by 100 m and 10 m deep, it would have a volume of 100,000 cubic meters ($1\times10^{-4}$ cubic kilometers) and, in this example, the model can include 40 million cells. A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results too are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (SLB, Houston Texas) or the PIPESIM network simulator (SLB, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (SLB, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena. The MANGROVE simulator (SLB, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

As mentioned, a framework may be implemented within or in a manner operatively coupled to the DELFI environment, which is a secure, cognitive, cloud-based collaborative environment that integrates data and workflows with digital technologies, such as artificial intelligence and machine learning. As an example, such an environment can provide for operations that involve one or more frameworks. The DELFI environment may be referred to as the DELFI framework, which may be a framework of frameworks. As an example, the DELFI framework can include various other frameworks, which can include, for example, one or more types of models (e.g., simulation models, etc.).

Figure 2:
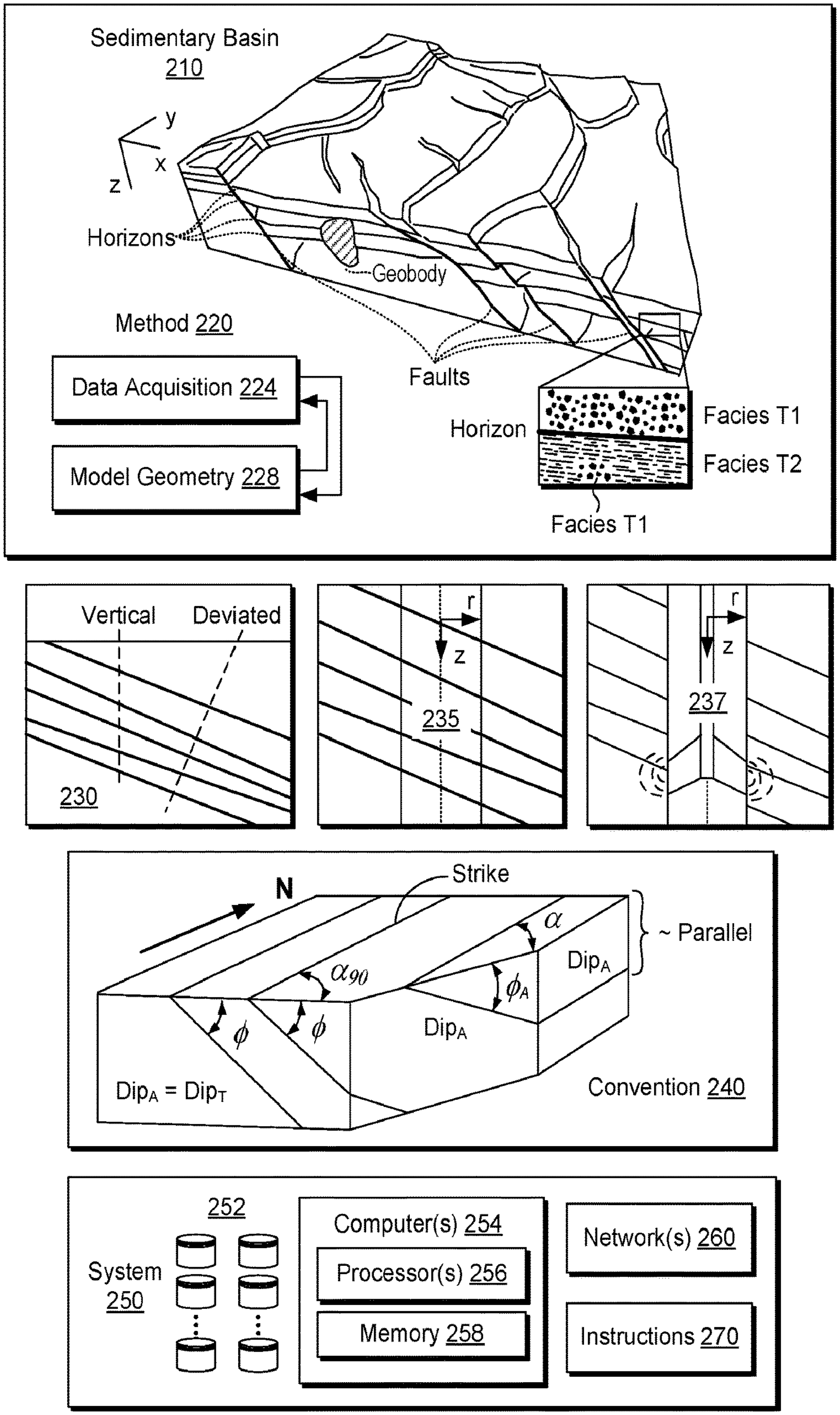
FIG. 2 illustrates examples of a basin, a convention and a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, data acquisition, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop, and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool can include one or more sensors that can acquire borehole images via one or more imaging techniques. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a tool may be positioned to acquire information in a portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the aforementioned TECHLOG framework (SLB, Houston, Texas).

As an example, a workflow may utilize one or more types of data for one or more processes (e.g., stratigraphic modeling, basin modeling, completion designs, drilling, production, injection, etc.). As an example, one or more tools may provide data that can be used in a workflow or workflows that may implement one or more frameworks (e.g., PETREL, TECHLOG, PETROMOD, ECLIPSE, etc.).

As to the convention 240 for dip, as shown in FIG. 2, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles $\phi$ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A$=$Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $Dip_A$=$Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As shown in FIG. 2, the system 250 includes one or more information storage devices 252, one or more computers 254, one or more networks 260 and instructions 270. As to the one or more computers 254, each computer may include one or more processors (e.g., or processing cores) 256 and memory 258 for storing instructions, for example, consider the instructions 270 as including instructions executable by at least one of the one or more processors. As an example, a computer may include one or more network interfaces (e.g., wired or wireless), one or more graphics cards (e.g., one or more GPUs, etc.), a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252. As an example, the system 250 may be local, remote or in part local and in part remote. As to remote resources, consider one or more cloud-based resources (e.g., as part of a cloud platform, etc.).

As an example, the instructions 270 may include instructions (e.g., stored in memory) executable by one or more processors to instruct the system 250 to perform various actions. As an example, the system 250 may be configured such that the instructions 270 provide for establishing one or more aspects of the workspace framework 110 of FIG. 1. As an example, one or more methods, techniques, etc. may be performed at least in part via instructions, which may be, for example, instructions of the instructions 270 of FIG. 2.

As an example, a framework can include various components. For example, a framework can include one or more components for prediction of reservoir performance, one or more components for optimization of an operation or operations, one or more components for control of production engineering operations, etc. As an example, a framework can include components for prediction of reservoir performance, optimization and control of production engineering operations performed at one or more reservoir wells. Such a framework may, for example, allow for implementation of various methods. For example, consider an approach that allows for a combination of physics-based and data-driven methods for modeling and forecasting a reservoir production and optionally for control of field equipment.

Figure 3:
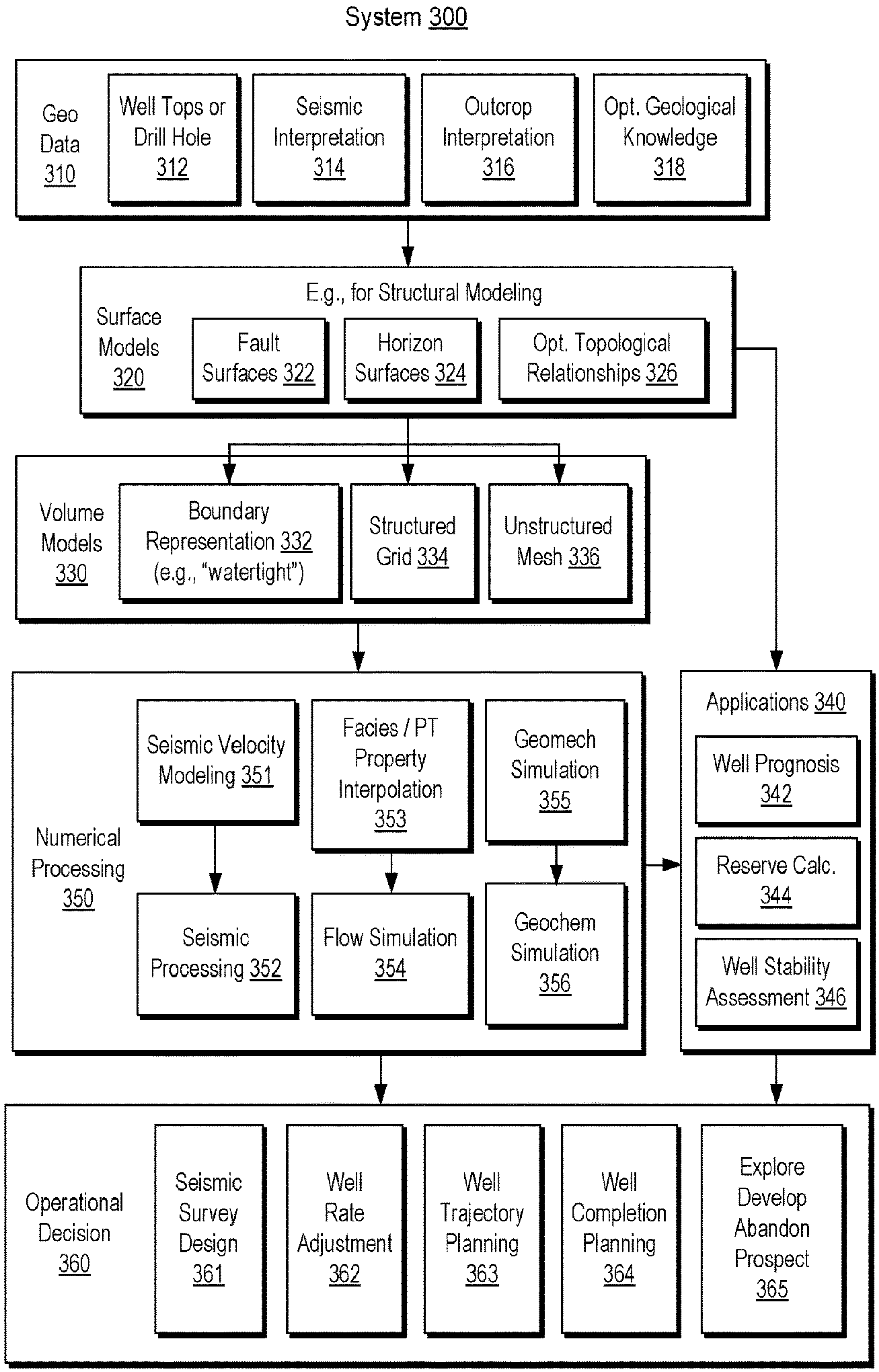
FIG. 3 illustrates an example of a system.

FIG. 3 shows an example of a system 300 that includes a geological/geophysical data block 310, a surface models block 320 (e.g., for one or more structural models), a volume modules block 330, an applications block 340, a numerical processing block 350 and an operational decision block 360. As shown in the example of FIG. 3, the geological/geophysical data block 310 can include data from well tops or drill holes 312, data from seismic interpretation 314, data from outcrop interpretation and optionally data from geological knowledge. As to the surface models block 320, it may provide for creation, editing, etc. of one or more surface models based on, for example, one or more of fault surfaces 322, horizon surfaces 324 and optionally topological relationships 326. As to the volume models block 330, it may provide for creation, editing, etc. of one or more volume models based on, for example, one or more of boundary representations 332 (e.g., to form a watertight model), structured grids 334 and unstructured meshes 336.

As shown in the example of FIG. 3, the system 300 may allow for implementing one or more workflows, for example, where data of the data block 310 are used to create, edit, etc. one or more surface models of the surface models block 320, which may be used to create, edit, etc. one or more volume models of the volume models block 330. As indicated in the example of FIG. 3, the surface models block 320 may provide one or more structural models, which may be input to the applications block 340. For example, such a structural model may be provided to one or more applications, optionally without performing one or more processes of the volume models block 330 (e.g., for purposes of numerical processing by the numerical processing block 350). Accordingly, the system 300 may be suitable for one or more workflows for structural modeling (e.g., optionally without performing numerical processing per the numerical processing block 350).

As to the applications block 340, it may include applications such as a well prognosis application 342, a reserve calculation application 344, and a well stability assessment application 346. As to the numerical processing block 350, it may include a process for seismic velocity modeling 351 followed by seismic processing 352, a process for facies and petrophysical property interpolation 353 followed by flow simulation 354, and a process for geomechanical simulation 355 followed by geochemical simulation 356. As indicated, as an example, a workflow may proceed from the volume models block 330 to the numerical processing block 350 and then to the applications block 340 and/or to the operational decision block 360. As another example, a workflow may proceed from the surface models block 320 to the applications block 340 and then to the operational decisions block 360 (e.g., consider an application that operates using a structural model).

In the example of FIG. 3, the operational decisions block 360 may include a seismic survey design process 361, a well rate adjustment process 362, a well trajectory planning process 363, a well completion planning process 364, and a process for one or more prospects 365, for example, to decide whether to explore, develop, abandon, etc. a prospect.

Referring again to the data block 310, the well tops or drill hole data 312 may include spatial localization, and optionally surface dip, of an interface between two geological formations or of a subsurface discontinuity such as a geological fault; the seismic interpretation data 314 may include a set of points, lines or surface patches interpreted from seismic reflection data, and representing interfaces between media (e.g., geological formations in which seismic wave velocity differs) or subsurface discontinuities; the outcrop interpretation data 316 may include a set of lines or points, optionally associated with measured dip, representing boundaries between geological formations or geological faults, as interpreted on the earth surface; and the geological knowledge data 318 may include, for example knowledge of the paleo-tectonic and sedimentary evolution of a region.

As to a structural model, it may be, for example, a set of gridded or meshed surfaces representing one or more interfaces between geological formations (e.g., horizon surfaces) or mechanical discontinuities (fault surfaces) in the subsurface. As an example, a structural model may include some information about one or more topological relationships between surfaces (e.g. fault A truncates fault B, fault B intersects fault C, etc.).

As to the one or more boundary representations 332, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 334, it may include a grid that partitions a volume of interest into different elementary volumes (cells), for example, that may be indexed according to a pre-defined, repeating pattern. As to the one or more unstructured meshes 336, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 351, it may include calculation of velocity of propagation of seismic waves (e.g., where seismic velocity depends on type of seismic wave and on direction of propagation of the wave). As to the seismic processing 352, it may include a set of processes allowing identification of localization of seismic reflectors in space, physical characteristics of the rocks in between these reflectors, etc.

As to the facies and petrophysical property interpolation 353, it may include an assessment of type of rocks and of their petrophysical properties (e.g. porosity, permeability), for example, optionally in areas not sampled by well logs or coring. As an example, such an interpolation may be constrained by interpretations from log and core data, and by prior geological knowledge.

As to the flow simulation 354, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 355, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example, a geomechanical simulation may be used for a variety of purposes such as, for example, prediction of fracturing, reconstruction of the paleo-geometries of the reservoir as they were prior to tectonic deformations, etc.

As to geochemical simulation 356, such a simulation may simulate evolution of hydrocarbon formation and composition through geological history (e.g., to assess the likelihood of oil accumulation in a particular subterranean formation while exploring new prospects).

As to the various applications of the applications block 340, the well prognosis application 342 may include predicting type and characteristics of geological formations that may be encountered by a drill-bit, and location where such rocks may be encountered (e.g., before a well is drilled); the reserve calculations application 344 may include assessing total amount of hydrocarbons or ore material present in a subsurface environment (e.g., and estimates of which proportion can be recovered, given a set of economic and technical constraints); and the well stability assessment application 346 may include estimating risk that a well, already drilled or to-be-drilled, will collapse or be damaged due underground stress.

As to the operational decision block 360, the seismic survey design process 361 may include deciding where to place seismic sources and receivers to optimize the coverage and quality of the collected seismic information while minimizing cost of acquisition; the well rate adjustment process 362 may include controlling injection and production well schedules and rates (e.g., to maximize recovery and production); the well trajectory planning process 363 may include designing a well trajectory to maximize potential recovery and production while minimizing drilling risks and costs; the well completion planning process 364 may include selecting proper well tubing, casing and completion (e.g., to meet expected production or injection targets in specified reservoir formations); and the prospect process 365 may include decision making, in an exploration context, to continue exploring, start producing or abandon prospects (e.g., based on an integrated assessment of technical and other risks against expected benefits).

Figure 4:
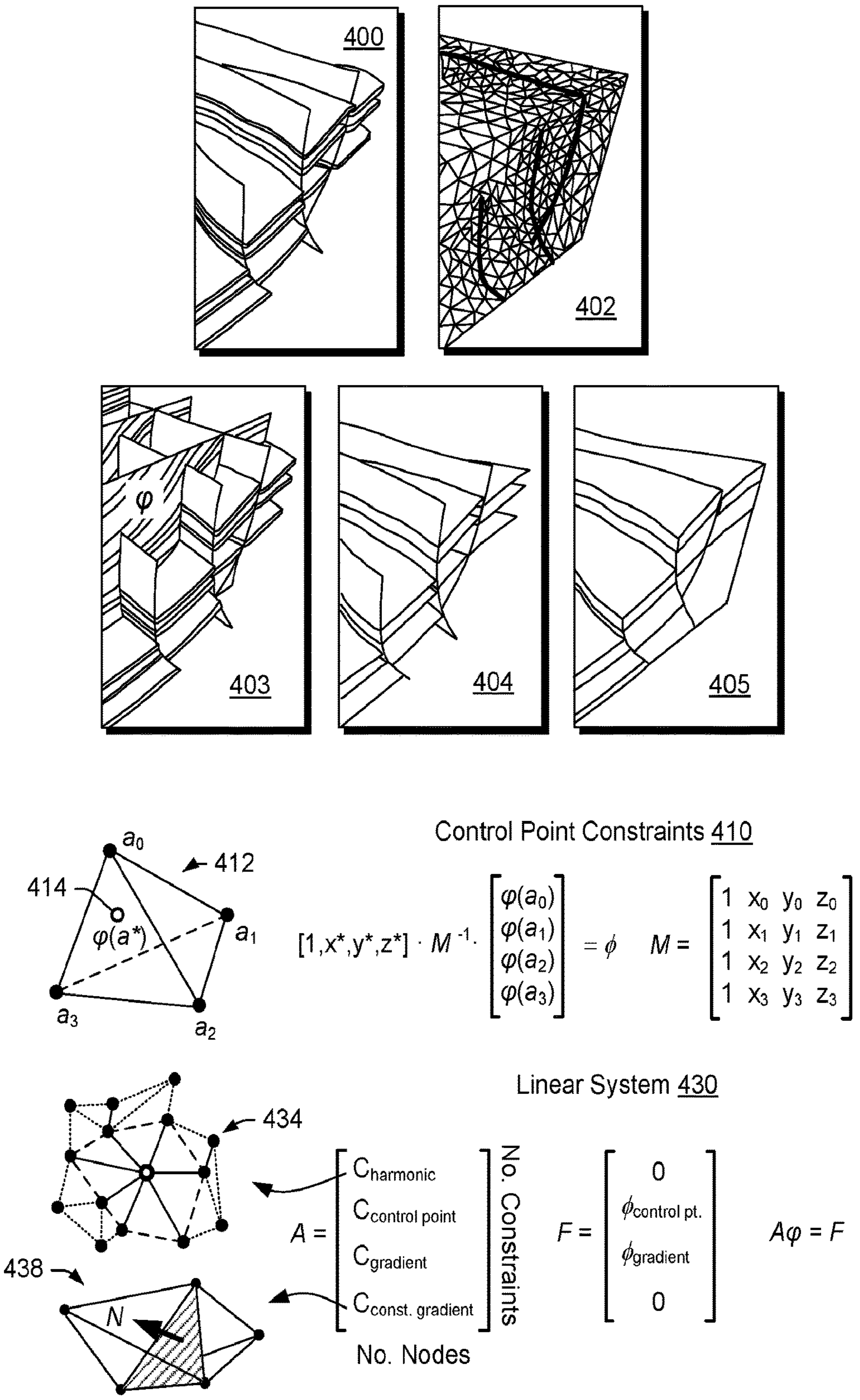
FIG. 4 illustrates examples of representations of a geologic environment and implicit function equations.

FIG. 4 shows an example of a plot of a geologic environment 400 that may be represented in part by the convention 240 of FIG. 2. As an example, a method may employ implicit modeling to analyze the geologic environment, for example, as shown in the plots 402, 403, 404, and 405. FIG. 4 also shows an example of a control point constraints formulation 410 and an example of a linear system of equations formulation 430, which pertain to an implicit function (q).

In FIG. 4, the plot of the geologic environment 400 may be based at least in part on input data, for example, related to one or more fault surfaces, horizon points, etc. As an example, one or more features in such a geologic environment may be characterized in part by dip.

Referring to the plots 402, 403, 404, and 405 of FIG. 4, these may represent portions of a method that can generate a model of a geologic environment such as the geologic environment represented in the plot 210 of FIG. 2.

As an example, a volume based modeling (VBM) method may include receiving input data (see, e.g., the plot 400); generating a volume mesh, which may be, for example, an unstructured tetrahedral mesh (see, e.g., the plot 402); calculating implicit function values, which may represent stratigraphy and which may be optionally rendered using a periodic map (see, e.g., the plot 403 and the implicit function q as represented using periodic mapping); extracting one or more horizon surfaces as iso-surfaces of the implicit function (see, e.g., the plot 404); and generating a watertight model of geological layers, which may optionally be obtained by subdividing a model at least in part via implicit function values (see, e.g., the plot 405).

As an example, an implicit function calculated for a geologic environment includes isovalues that may represent stratigraphy of modeled layers. For example, depositional interfaces identified via interpretations of seismic data (e.g., signals, reflectors, etc.) and/or on borehole data (e.g., well tops, etc.) may correspond to iso-surfaces of the implicit function. As an example, where reflectors correspond to isochronous geological sequence boundaries, an implicit function may be a monotonous function of stratigraphic age of geologic formations.

As an example, a process for creating a geological model may include: building an unstructured faulted 2D mesh (e.g., if a goal is to build a cross section of a model) or a 3D mesh from a watertight representation of a fault network; representing, according to an implicit function-based volume attribute, stratigraphy by performing interpolations on the built mesh; and cutting the built mesh based at least in part on iso-surfaces of the attribute to generate a volume representation of geological layers. Such a process may include outputting one or more portions of the volume representation of the geological layers (e.g., for a particular layer, a portion of a layer, etc.).

As an example, to represent complex depositional patterns, sequences that may be separated by one or more geological unconformities may optionally be modeled using one or more volume attributes. As an example, a method may include accounting for timing of fault activity (e.g., optionally in relationship to deposition) during construction of a model, for example, by locally editing a mesh on which interpolation is performed (e.g., between processing of two consecutive conformable sequences).

Referring to the control point constraints formulation 410, a tetrahedral cell 412 is shown as including a control point 414. As an example, an implicit function may be a scalar field. As an example, an implicit function may be represented as a property or an attribute, for example, for a volume (e.g., a volume of interest). As an example, the aforementioned PETREL framework may include a volume attribute that includes spatially defined values that represent values of an implicit function.

As an example, as shown with respect to the linear system of equations formulation 430, a function "F" may be defined for coordinates (x, y, z) and equated with an implicit function denoted φ. As to constraint values, the function F may be such that each input horizon surface "I" corresponds to a known constant value $h_i$ of φ. For example, FIG. 4 shows nodes (e.g., vertices) of the cell 412 as including $a_0$, $a_1$, $a_2$, and as $a_3$ well as corresponding values of φ (see column vector). As to the values value $h_i$ of φ, if a horizon I is younger than horizon J, then $h_i>h_j$ and, if one denotes T_ij* as an average thickness between horizons I and J, then $(h_k-h_i)/(h_j-h_i)$~T_ik*/Tij*, for which a method can include estimating values of T_ij* before an interpolation is performed. Note that such a method may, as an example, accept lower values $h_i$ of q for younger horizons, where, for example, a constraint being that, within each conformal sequence, the values $h_i$ of φ vary monotonously with respect to the age of the horizons.

As to interpolation of "F", as an example, φ may be interpolated on nodes of a background mesh (e.g., a triangulated surface in 2D, a tetrahedral mesh in 3D, a regular structured grid, quad/octrees, etc.) according to several constraints that may be honored in a least squares sense. In such an example, as the background mesh may be discontinuous along faults, interpolation may be discontinuous as well; noting that "regularization constraints" may be included, for example, for constraining smoothness of interpolated values.

As an example, a method may include using fuzzy control point constraints. For example, at a location of interpretation points, $h_i$ of φ (see, e.g. point a* in FIG. 4). As an example, an interpretation point may be located at a location other than that of a node of a mesh onto which an interpolation is performed, for example, as a numerical constraint may be expressed as a linear combination of values of φ at nodes of a mesh element (e.g. a tetrahedron, tetrahedral cell, etc.) that includes the interpretation point (e.g., coefficients of a sum being barycentric coordinates of the interpretation point within the element or cell).

For example, for an interpretation point p of a horizon I located inside a tetrahedron which includes vertices are $a_0$, $a_1$, $a_2$ and as and which barycentric coordinates are $b_0$, $b_1$, $b_2$, and $b_3$ (e.g., such that the sum of the barycentric coordinates is approximately equal to 1) in the tetrahedron, an equation may be formulated as follows:

$$b_0\,\varphi(a_0)+b_1\,\varphi(a_1)+b_2\,\varphi(a_2)+b_3\,\varphi(a_3)=h_i$$

where unknowns in the equation are $\varphi(a_0)$, $\varphi(a_1)$, $\varphi(a_2)$, and $\varphi(a_3)$. For example, refer to the control point $\varphi(a^*)$, labeled 414 in the cell 412 of the control point constraints formulation 410 of FIG. 4, with corresponding coordinates $(x^*,y^*,z^*)$; noting a matrix "M" for coordinates of the nodes or vertices for $a_0$, $a_1$, $a_2$ and $a_3$, (e.g., $x_0$, $y_0$, $z_0$ to $x_3$, $y_3$, $z_3$).

As an example, a number of such constraints of the foregoing type may be based on a number of interpretation points where, for example, interpretation points may be for decimated interpretation (e.g., for improving performance).

As mentioned, a process may include implementing various regularization constraints, for example, for constraining smoothness of interpolated values, of various orders (e.g., constraining smoothness of φ or of its gradient $\nabla_\varphi$), which may be combined, for example, through a weighted least squares scheme.

As an example, a method can include constraining the gradient $\nabla_\varphi$ in a mesh element (e.g. a tetrahedron, a tetrahedral cell, etc.) to take an arithmetic average of values of the gradients of φ (e.g., a weighted average) with respect to its neighbors (e.g., topological neighbors). As an example, one or more weighting schemes may be applied (e.g. by volume of an element) that may, for example, include defining of a topological neighborhood (e.g., by face adjacency). As an example, two geometrically "touching" mesh elements that are located on different sides of a fault may be deemed not topological neighbors, for example, as a mesh may be "unsewn" along fault surfaces (e.g., to define a set of elements or a mesh on one side of the fault and another set of elements or a mesh on the other side of the fault).

As an example, within a mesh, if one considers a mesh element mi that has n neighbors $m_j$ (e.g., for a tetrahedron), one may formulate an equation of an example of a regularization constraint as follows:

$$\nabla\varphi(m_i)=\frac{1}{n}\sum_{j=1}^{n}\nabla\varphi(m_j)$$

In such an example of a regularization constraint, solutions for which isovalues of the implicit function would form a "flat layer cake" or "nesting balls" geometries may be considered "perfectly smooth" (i.e. not violating the regularization constraint), it may be that a first one is targeted.

As an example, one or more constraints may be incorporated into a system in linear form. For example, hard constraints may be provided on nodes of a mesh (e.g., a control node). In such an example, data may be from force values at the location of well tops. As an example, a control gradient, or control gradient orientation, approach may be implemented to impose dip constraints.

Referring again to FIG. 4, the linear system of equations formulation 330 includes various types of constraints. For example, a formulation may include harmonic equation constraints, control point equation constraints (see, e.g., the control point constraints formulation 410), gradient equation constraints, constant gradient equation constraints, etc. As shown in FIG. 4, a matrix A may include a column for each node and a row for each constraint. Such a matrix may be multiplied by a column vector such as the column vector $\varphi(a_i)$ (e.g., or φ), for example, where the index "i" corresponds to a number of nodes, vertices, etc. for a mesh (e.g., a double index may be used, for example, $a_{ij}$, where j represents an element or cell index). As shown in the example of FIG. 4, the product of A and the vector φ may be equated to a column vector F (e.g., including non-zero entries where appropriate, for example, consider control point and Øgradient).

FIG. 4 shows an example of a harmonic constraint graphic 434 and an example of a constant gradient constraint graphic 438. As shown per the graphic 434, nodes may be constrained by a linear equation of a harmonic constraint (e.g., by topological neighbors of a common node). As shown per the graphic 438, two tetrahedra may share a common face (cross-hatched), which is constrained to share a common value of a gradient of the implicit function φ, which, in the example of FIG. 4, constrains the value of φ at the 5 nodes of the two tetrahedra.

As an example, regularization constraints may be used to control interpolation of an implicit function, for example, by constraining variations of a gradient of the implicit function. As an example, constraints may be implemented by specifying (e.g., as a linear least square constraint) that the gradient should be similar in two co-incident elements of a mesh or, for example, by specifying that, for individual elements of a mesh, that a gradient of the implicit function should be an average of the gradients of the neighboring elements. In geological terms, such constraints may translate to (1) minimization of variations of dip and thickness of individual layers, horizontally, and (2) to minimization of the change of relative layer thicknesses, vertically.

As explained with respect to FIG. 4, a model may utilize an unstructured grid such as a tetrahedral grid as in the plot 402 where the faults are explicitly modeled. If a change is to be made to a position of a fault, the model may demand re-gridding (e.g., re-meshing), which can be computationally demanding. As an example, a method can include utilizing a hexahedral grid where one or more discontinuities are embedded in the hexahedral grid in a manner that results in relatively flexible gridding that can be readily adapted to one or more changes.

Figure 5:
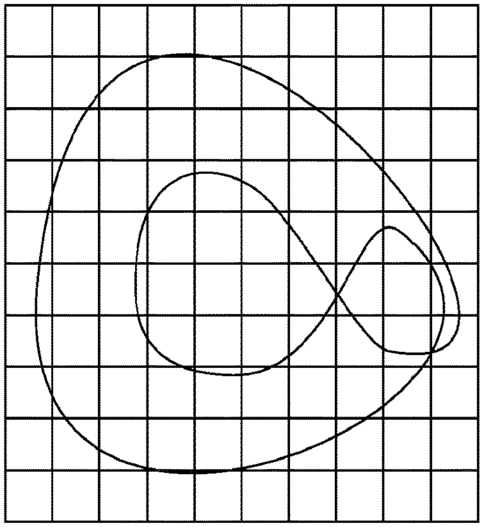
FIG. 5 illustrates an example of a method via graphics.
Figure 5:
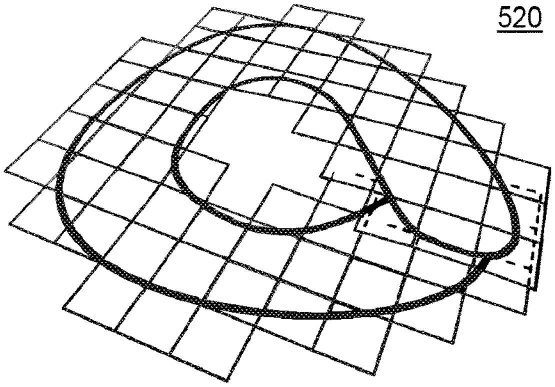
Figure 5:
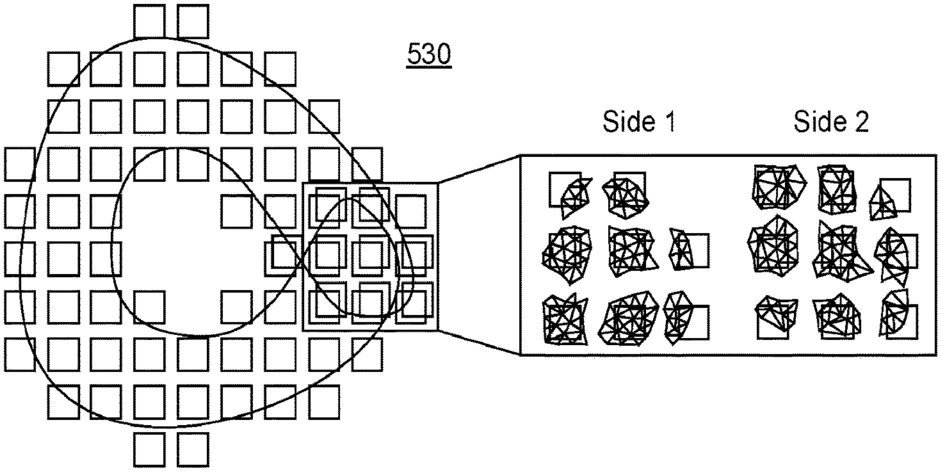

FIG. 5 shows an example of an approach to modeling where a grid can represent topology and where cut cells can help to define the topology of the grid, optionally in a non-manifold manner. As an example, a hexcell approach to discretization of a computational domain can be adapted for representing one or more discontinuous features. For example, consider representing a fault, an erosion, or another type of discontinuity.

In FIG. 5, a multidimensional example is shown with two spatial dimensions for an object that has portions that overlap, which may be referred to as a self-overlapping 2D object that can be represented using a template mesh as imposed in a graphic 510. In such an example, the self-overlapping 2D object may itself be meshed such as, for example, consider a triangle mesh that includes triangles where each triangle has an area that is less than an area of the template mesh (e.g., the squares of a grid that is utilized for cutting or to be cut).

In the example of FIG. 5, if the 2D object did not overlap on itself, the representation of the 2D object in a 2D domain would be relatively straight forward. However, if the 2D object existed in a 3D domain, then its representation is not straight forward. For example, consider a fault as a type of discontinuity that exists in a 3D geologic environment to be modeled. As the 3D geologic environment is to be modeled, the fact that the fault may be represented by a 2D shape does not have a substantial impact on complexity of modeling the 3D geologic environment as the resulting model is 3D. Hence, when a 2D object is embedded within a 3D spatial domain, the 2D object will inherently have multiple sides. However, an approach such as that of the example of FIG. 5 may be utilized to account for the two different sides via an increase in the number of cells (e.g., a set of cells to represent one side and a set of cells to represent another side where the sets of cells may be a result of cutting of cells).

As an example, grid may be interchangeable with mesh and, in some instances, grid may refer to a structured grid, for example, with a regular structure and mesh may refer to an unstructured grid (or unstructured mesh) with a variable connectivity pattern (e.g., consider a triangular mesh). As to a hexcell approach, a grid can be utilized for a domain where the grid may be regularly or irregularly spaced. For example, consider an octree approach, which may provide for various refinements. In various examples, cells are of a regular nature (e.g., hexahedral or six-faced). As an example, mesh may refer to a representation that can represent geometry of a discontinuity (e.g., an object, etc.) before being introduced into a grid (e.g., before cutting a hexahedral grid, etc.).

As an example, a method can include embedding, which can be a process that accounts for different sides of an object. For example, such a method can include receiving or generating a geometric description of a shape (e.g., consider a triangle mesh) to be embedded and a mesh (e.g., a structured grid, regular or irregular) that may be utilized as a template for an embedding process. In the example of FIG. 5, the mesh is shown to be a regular quadrilateral mesh; noting that one or more other types of meshes may be utilized. As a first action, consider element separation where each element of the template (quadrilateral) mesh is separated while keeping track of the subset of the object that is contained in each such element (e.g. taking note of material triangles of the object's mesh that intersected each quadrilateral). As a next action, consider element duplication for disconnected components of the object. In such an action, for each embedding element, identification occurs for disjoint connected components of material contained therein (e.g., by checking connectivity of the respective material triangles). As shown in a graphic 520 of FIG. 5, such an action can include generating a duplicate embedding (quadrilateral) element for each material component; however, at this point, the embedding elements are disconnected. To address the disconnections, an action can be performed that aims to suitably restore appropriate connectivity. For example, for a pair of geometrically adjacent embedding elements, such an action can include determining if there is material continuity across a common face (e.g., by checking if they both intersect the same material triangle on that face). If such continuity exists, then such an action can include collapsing vertices along the common face where such a collapse can be transitive. For example, consider three elements near a convex material region that have acquired a common face due to transitive pair-wise vertex collapses. The result of such a method is shown in a graphic 530 of FIG. 5, where, after discarding embedding elements that do not include material content of the object, a final embedding mesh can be assembled, with overlapping duplicates of elements properly connected, respecting the topology of the embedded material of the object.

As explained, in the graphic 510, an object, which itself may be meshed, can be discretized via a mesh (e.g., a grid). In the graphic 520, duplicate elements are created during embedded mesh generation, along with their associated material fragments of the object and, in the graphic 530, a final embedding mesh (e.g., grid) is shown. The example of FIG. 5 pertains to a 2D self-overlapping object in a 2D grid where sides are "created" to account for overlap. Again, if the 2D self-overlapping object were disposed in a 3D grid, sides can be accounted for within the 3D grid (e.g., 3D domain) and additional accounting may be included for the surfaces of the 2D self-overlapping object that are in contact in the overlapping region.

As explained, a grid can be used to represent complex topologies in a computational domain, allowing introduction of different sides of topologically separated zones that may occupy a common geometric location (e.g., the overlapping portions of the object in the graphic 510 of FIG. 5). As two portions of the object occupy the same space in the 2D grid, an embedding can be performed such that each side of the 2D object in the overlapping 2D space can be appropriately defined and represented. As explained, connectivity can be set aside when representing each side and then restored. In other words, a zone of overlap can be represented by two sets of disconnected cells (one for each "side" of an object) followed by restoration of connectivity.

In the example of FIG. 5, the term "non-manifold" reflects the fact that the connectivity of the cells in this special grid region of the self-overlapping object is somewhat different from that of a regular grid as may be utilized to represent a portion of the object that does not have an overlap. As explained, a cell, in a given direction, may be linked by a virtual face to more than one cell to represent two parts.

As an example, a hexcell-based approach can reduce storage and editing demands and can provide for increased scalability. As to a tetrahedral mesh approach, it can be difficult to generate finite element tetrahedral meshes within complex environments such as structural models which can have an arbitrary level of complexity. Further, tetrahedral meshes can include various elements with substantial aspect ratios, small internal angles, etc., which can confound a solver. A hexcell data structure can expedite modeling and use of the finite element method, as appropriate.

As to a hexcell approach, it can include embedding, cutting, and connecting where, for example, two opposite sides of a discontinuity can be represented via sets of cells with connections. In a hexcell approach, two hexahedral cells can occupy the same space where each of the two hexahedral cells is a result of cutting an initial hexahedral cell. For example, a discontinuity can cut an initial hexahedral cell into a first portion and a second portion where one hexahedral cell can represent the first portion and another hexahedral cell can represent the second portion.

A hexcell approach can be a topological approach to discretization of a computational domain that can be adapted for representing one or more discontinuous features. For example, consider representing a fault, an erosion, or another type of discontinuity. As an example, various types of cells may be referred to as topological cells as they represent topology. For example, a hexahedral cell may be a topological cell that includes a cut cell such that part of the topological cell represents actual subsurface material (e.g., feature, features, structure, etc.) while another part of the topological cell does not represent actual subsurface material. In such an example, the topological cell retains favorable characteristics for purposes of computations, memory utilization, storage in memory, recall from memory, etc.

As to a hexcell approach, a grid can be utilized for a domain where the grid may be regularly or irregularly spaced. For example, consider an octree approach, which may provide for various refinements. In various examples, cells are of a regular nature (e.g., hexahedral or six-faced).

As an example, an embedding approach can be utilized to represent a discontinuity in a geologic environment. For example, consider a discontinuity as being a structural feature of a geologic environment where the structural feature can make a region of the geologic environment non-homogenous, which may have an effect or effects on one or more physical phenomena. An embedding approach can provide for representing such a structural feature in a manner that can facilitate modeling and, for example, simulation of one or more physical phenomena.

As explained, a geologic environment can be 3D and a discontinuity as a structural feature may be represented as a 2D object or as a 3D object. As a discontinuity such as a fault tends to be quite thin compared to cell dimensions of a hexahedral grid, the discontinuity can be represented as a 2D object that itself may be meshed (e.g., via a triangle mesh, etc.) where elements of the mesh tend to be smaller in area than cross-sectional area(s) of a 3D hexahedral grid cell or simply 3D cell.

Figure 6:
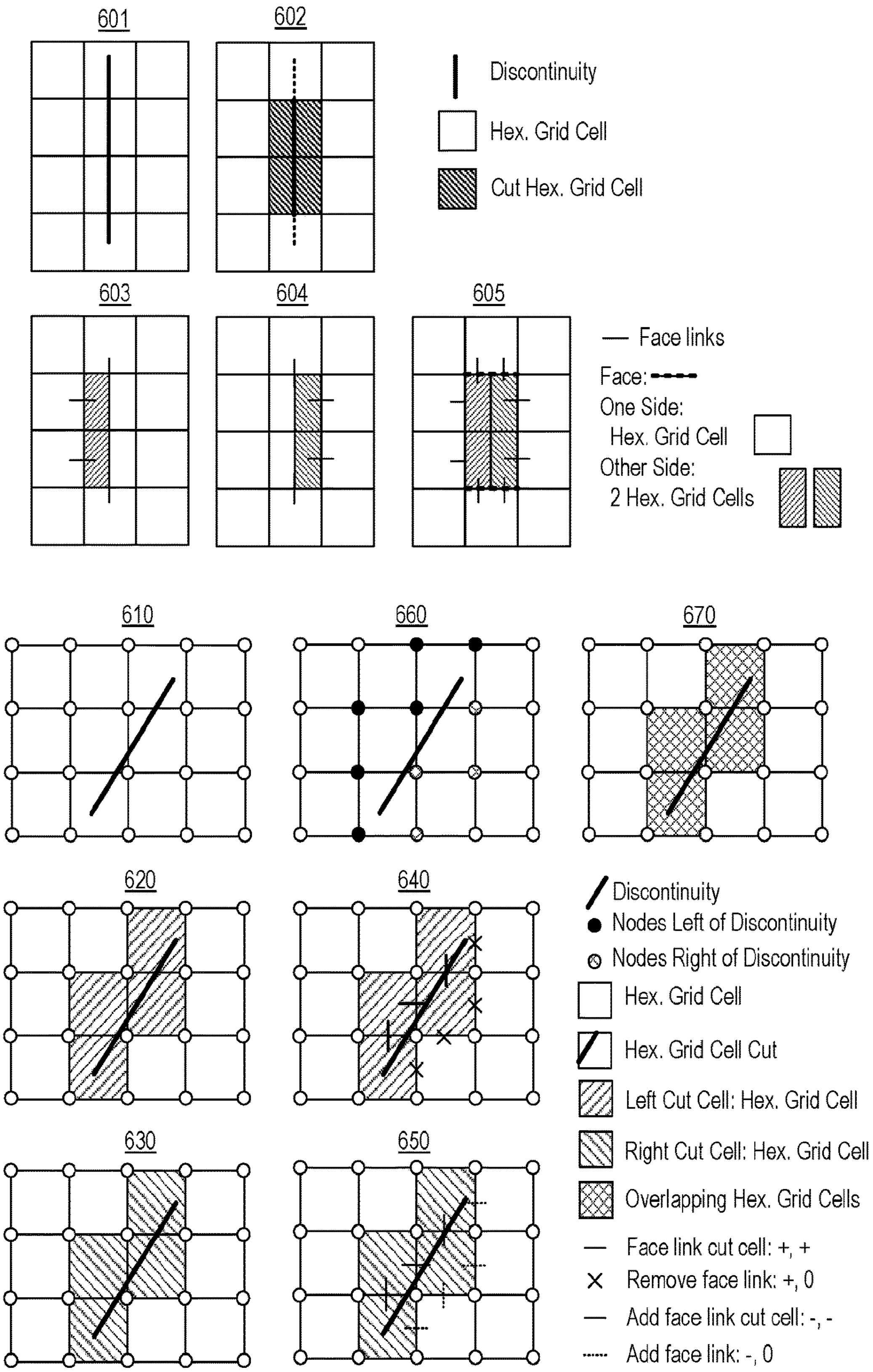
FIG. 6 illustrates examples of methods via graphics.

FIG. 6 shows a series of example grids 601, 602, 603, 604, 605, 610, 620, 630, 640, 650, 660, and 670 as associated with various actions that may be utilized for representing a discontinuity in a computational domain. In the example of FIG. 6, for purposes of explanation, a 2D grid is shown with a discontinuity represented by a line that is tilted with respect to coordinate axes of the 2D grid.

As an example, usage of a hexcell approach can be for generation of a stratigraphic model (e.g., horizons, zones generation, etc.) or may be for generation of one or more other subsurface computations such as, for example, velocity modeling, flow simulation or geomechanics.

In the grids 601 and 602 of FIG. 6, a discontinuity is shown as a thick line in cells where the discontinuity traverses two of the cells fully with ends that extend into two adjacent cells, one above and one below the two traversed cells. As shown, these two cells can be cut such that there are left cells and right cells (e.g., four cut cells, two left cells and two right cells generated from cutting of the two original cells). As such, the number of cells has increased by two. In other words, the 2D grid now includes two additional cells though they occupy the same space as the two original cells where the two additional cells account for cutting of the two original cells.

Cutting ultimately generates cut cells where two cut cells do not have a "common face" or a "shared face". Rather, two cut cells can be used to define a topological grid where a face of one cut cell and a face of another cut cell are not common/shared but can occupy the same physical space in a domain (e.g., hence involving a topological description). While cutting a hexahedral grid with fault triangles, a cut cell on a given side can have been cut by the same fault triangle as the cut cell on the other side (in fact they may have been cut by several triangles); yet, they do not have this fault triangle in common, they are just disconnected.

As an example, a method can include utilization of links that represent a hexcell grid topology (e.g., face links linking hexahedral elements sharing a common face). Such links define how cells connect to each other (e.g., by sharing a face).

A method can include providing a sealed representation of a discontinuity such as a fault; providing a regular, hexahedral grid with hexahedral cells; and using the regular, hexahedral grid to cut the fault, which cuts some of the hexahedral cells to produce cut cells. From cut vertices/nodes and cut edges, a method can then define cut faces and then cut cells.

Again, in the grids 601 to 605, a single fault can provide for cutting completely two cells and finishing in two other cells containing the tips of the single fault as opposing ends of the single fault. A method can include clamping the fault in cells containing it entirely (see, e.g., the dashed line). In the example of FIG. 6, in the grids 601 to 605, there are four cut cells: two left cut cells for the left side and two right cut cells for the right side. In a topological grid, the cut cells can be full cells where a left cut cell and a right cut cell, as two full cells, occupy the same physical space (e.g., overlap completely). The short lines indicate links between the hexahedral cells. The faces are shown in the grid 605 where, on one side there is a "regular" cell and it has a link with two hexahedral cells which results from cut cells. Therefore, the face has more than one link (e.g., it may be non-manifold and form a sort of trouser-like shape); hence, the reason for introduction of topology to define a topological grid.

Once a method generates the cut-cell decomposition, links can be established to know which face is shared between cut cells and the topology can be constructed. A single hexahedral cell is associated to each cut cell and then their links are constructed accordingly to the cut-cell's faces connections.

For a discontinuity that cuts a cell of a hexahedral regular grid to make two cut cells in that hexahedral regular grid, a method can include using a hexcell grid that now represents the discontinuity accurately with two hexahedral cells in the hexcell grid that are de-associated to thereby enable representation of the discontinuity.

A discontinuity can be represented by cutting and hence there can be two faces within a cell of a hexahedral regular grid. And, in such an example, those two faces are not "shared". They may occupy the same "space" but they are two separate/distinct faces. Cells on one side of the discontinuity can be neighbors and have a common/shared face; however, at a discontinuity, there are no common/shared faces because of the cutting.

As an example, for each square, if crossing at least one discontinuity, it can be divided in one-to-many polygonal cells that represent a new domain of computation which embeds the at least one discontinuity.

In the grid 610, the discontinuity is positioned as represented by a thick line. In such an example, the line is embedded in the grid where it can include two different sides, for example, a side to the left of the thick line and a side to the right of the thick line. The thick line can be utilized to flag cells of the grid 610 where such flagged cells can then be duplicated to generate two sets of cells where one of the two sets can represent one side (e.g., a left side) of the thick line and the other of the two sets can represent another, opposite side (e.g., a right side) of the thick line. As shown in the grids 620 and 630, a set of cells can represent the left side (cross-hatching pattern from lower left to upper right) and another set of cells can represent the right side (cross-hatching pattern from lower right to upper left) where the sets of cells spatially overlap (see the grid 670 where cross-hatching represents overlapping cells, which are shown separately in the grids 620 and 630 and in the grids 640 and 650). These two sets of cells can then be reconnected as appropriate to account for the topology of the grid. Again, as the sets of cells overlap, as shown in the grid 670, for sake of clarity in describing the approach, the grids 620, 630, 640 and 650 show these two sets of cells in separate illustrations. In various 4 by 3 grids of FIG. 6, the bottom, second from the left cell is both connected to a cell of the left set and a cell of the right set above to account for both sides, which deviates from the approach of a regular grid (e.g., a cell has on one cell connected "above" in a regular grid); hence, again, the meaning of the term non-manifold.

In FIG. 6, the graphics 640, 650, and 660 show markings that represent face link cut cell (e.g., +, +), remove face link (e.g., +, 0), add face link cut cell (e.g., −, −), and add face link (e.g., −, 0), along with filled and cross-hatched nodes that represent nodes to the left and nodes to the right of the discontinuity. As to "cut", the line representing the discontinuity is shown as cutting each of the four cells that include the line.

For 3D cells that may be hexahedral, cut cells are the cells resulting from the intersection of a hexahedral grid and a sealed discontinuity or discontinuities. As an example, a method can include cutting cells as part of a method that can produce a non-manifold grid with appropriate topology. Such an approach can include assessing a cut cell to be able to determine connectivity of grid cells. A cutting process by itself increases overall cell number as, what was once a single cell, upon cutting, becomes two cells. While cell number increases due to overlapping cells in space, the cells can remain hexahedral, albeit with an accounting for linkages, which may be relatively low in memory utilization.

As to a discontinuity in a geologic environment, it can have two sides where, for example, one side faces one direction and another side faces another direction. Such a structural feature of a geologic environment may be represented by imposing a grid on the structural feature and then defining cells where one or more of the cells may be cut and where sets of cells may be generated such that each set represents a side of the structural feature. In such an approach, the structural feature (e.g., a discontinuity) can be defined using a sealed representation where the grid imposed thereon slices or cuts it thereby resulting in cut cells (e.g., the grid cuts the object or the object cuts cells of the grid).

Where a grid is composed of hexahedral cells and the structural feature is represented in a three-dimensional spatial domain of the hexahedral cells, the result of a method can include cut vertices and cut edges that may be assembled in cut-faces and then cut cells.

As an example, Cartesian cut-cell-based mesh generation can provide representations in which volumetric elements are constructed from the intersection of the input surface geometry with a uniform or an adaptive hexahedral grid (e.g., hexcells).

An article by Tao et al., Mandoline: Robust Cut-Cell Generation for Arbitrary Triangle Meshes, ACM Trans. Graph, Vol. 38, No. 6, Article 179 (November 2019) is incorporated by reference herein and explains a surface triangle mesh and hexahedral grid approach. Such an approach may be utilized and/or one or more other approaches may be utilized for representation of a structural feature (e.g., a discontinuity) in a geologic environment.

Figure 7:
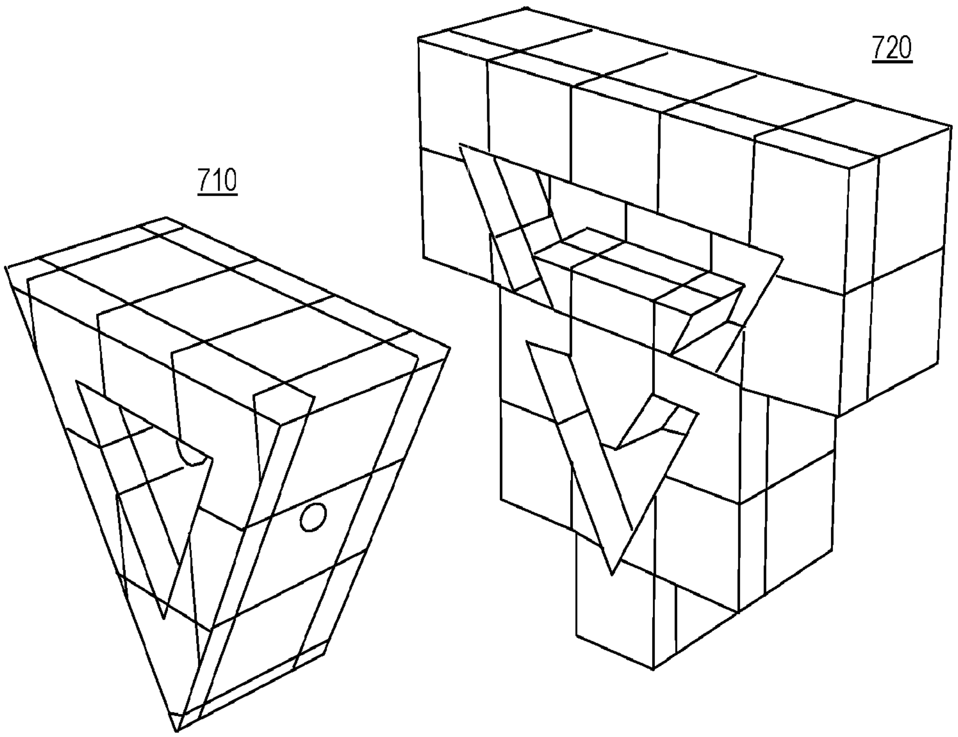
FIG. 7 illustrates an example of a method via graphics.

FIG. 7 shows an example of an object 710 that has a 3D shape where the object has been cut by cells of a grid or, alternatively, where the object cuts cells of the grid, which can be seen in a representation of the grid 720 as including a recess that can be filled by the object 710. In such an example, the object 710 and/or the grid 720 with the recess may be utilized, independently or in combination.

In various fields, such as animation, an object may be a surface meshed object where triangles may be utilized to represent the surface (e.g., a surface mesh of triangles). In such an example, each triangle of the surface mesh may be utilized in relationship to a grid that is a volumetric grid. In FIG. 7, the object 710 with the cuts shown can be considered a volumetric embedding of the object. And, in FIG. 7, the grid 720 with the recess can be considered a result of a volumetric embedding of the object in a domain.

As an example, Cartesian cut-cell-based mesh generation can provide representations in which volumetric elements are constructed from the intersection of the input surface geometry with a uniform or an adaptive hexahedral grid (e.g., hexcells). In the example of FIG. 7, a cut-cell construction technique is applied for a triangle surface mesh of the object 710 that can be utilized to compute geometry of the intersection cells (e.g., suitable for meshes that are open or non-manifold) of the hexahedral grid.

In the example of FIG. 7, the object 710 is a 3D shape generated from a projection of a 2D shape (e.g., an extrusion) where its surface can be represented using a surface triangle mesh (e.g., representing the object 710 as a shell using boundary elements, etc.). A method can include, for example, starting from input triangles of the surface mesh of the object 710, finding intersection points of triangle edges with a hexahedral cell grid's axial planes, which define the endpoints of new hybrid-edges lying within each triangle (e.g., triangle-plane intersection lines). Hybrid-edges subdivide the triangles into a collection of cut-edges. Cut-edges per triangle are traversed and assembled into cut-faces. The initial triangle intersection stages produce additional edges lying strictly within the axial planes; these can be processed similarly and in parallel to produce in-plane cut-edges and cut-faces. Finally, the full collection of cut-faces from both triangles and grid planes can be traversed to assemble the cut-cells.

Figure 8:
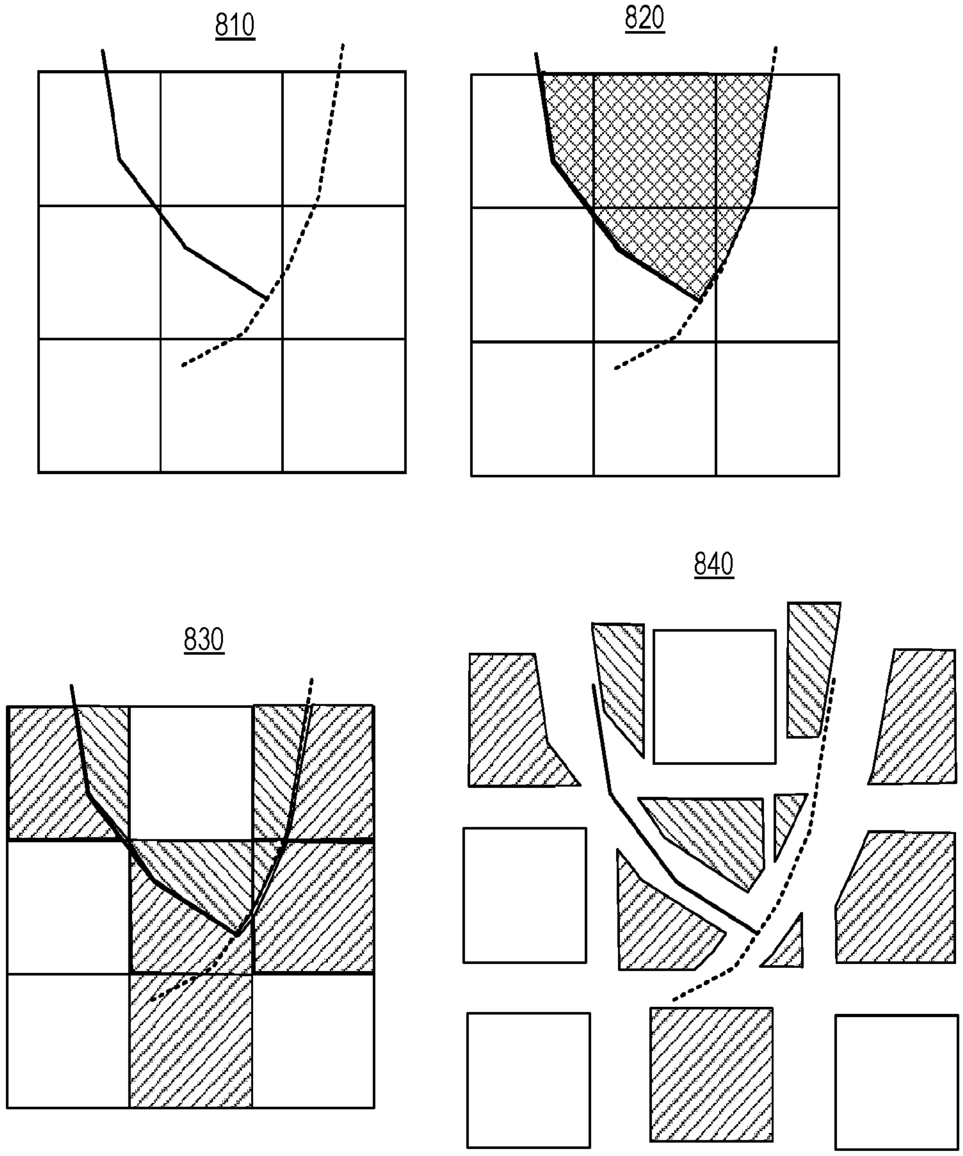
FIG. 8 illustrates an example of a method via graphics.

FIG. 8 shows example graphics 810, 820, 830, and 840 that help to explain an example of a method that can be utilized for representation of discontinuities in a geologic environment. As shown in the graphic 810, two discontinuities can exist in a geologic environment where, as shown in the graphic 820, the two discontinuities can define two separate regions (see, e.g., cross-hatched region and other region). In such an example, a grid is cut by the two discontinuities or the two discontinuities are utilized to generate cut cells (e.g., the cells in cross-hatching or the non-cross-hatched cells) in 2D where such an approach can be extended to 3D.

As shown in the graphic 830, cells are cut and associated with an interior region and an exterior region where a portion of one of the discontinuities extends into a cell without cutting it. Given the cuttings or cut-cell decomposition, a method can determine which face is shared between cut cells and reconstruct the topology. In a 3D approach, a single hexahedral cell is associated to each cut cell and then links are constructed accordingly to the cut-cell's faces connections. In FIG. 8, the graphic 840 shows the cells in an exploded view to highlight the cuts (e.g., generation of cut cells).

A hexcell approach provides flexibility for representing one or more discontinuities in a hexahedral grid where two sides of a discontinuity can be represented. For example, two represent the two sides of the discontinuity, particular cells can be duplicated. As shown in FIG. 8, where a discontinuity terminates (e.g., ends), the two sets of cells can merge (see, e.g., middle block in the graphics 820, 830 and 840.

In a 3D domain of hexahedral cells (e.g., a hexahedral grid), a discontinuity can cut various cells to generate polyhedral cells, which can be referred to as cut cells. In such a 3D example, cut faces can be polygonal. For a cell that is cut by a discontinuity, two faces can be generated, one for one cut portion of the cut cell and another for another cut portion of the cut cell. In such an example, each face can represent a side of the discontinuity.

In modeling of a geologic environment, a hexahedral grid can reduce various aspects of computational demand. A hexahedral grid can provide for a volume-based modeling (VBM) approach to compute horizons and can in various instances provide benefits over utilization of a surface-based approach. For example, interpolation between horizons can be more readily performed using a hexahedral grid and results can be more global, less noise sensitive, and more resistant to missing data. As such, a hexahedral grid approach, which can be volume-based, can provide benefits over a surface-based approach.

As an example, a method of modelling one or more discontinuities in a geologic environment can extend a volume-based approach to the special data structure of a hexcell (e.g., a hexahedral grid). Computations in hexahedral regular grids tend to be relatively facile computationally where interpolation and gradients can also be quite low in computational demands.

A hexcell representation provides various benefits when compared to tetrahedral meshes (e.g., as often utilized in VBM). For example, grid generation of a hexcell grid tends to be low demand and extremely fast computationally, about 10 to 20 times faster than computational tetrahedral mesh generation. As an example, a mesh can include thousands of cells and may include millions of cells; hence, meshes are not amenable to generation by hand and associated computations cannot practically be performed mentally. In a tetrahedral mesh approach, a 3D geologic environment may be meshed using tetrahedrals that have triangular faces that can fit to a discontinuity such that the geologic environment is deliberately meshed to account for the discontinuity. In such an approach, if a change is to be made to the number, size, shape, intersection, etc., of one or more discontinuities, then re-meshing of the tetrahedral mesh is performed, which consumes considerable time and resources. In contrast, where a hexcell grid is utilized with an embedding and cutting approach, each discontinuity can be handled without re-meshing (e.g., re-gridding) the hexcell grid. Rather, a method of embedding, cutting, and connecting can be performed that utilized a representation of the discontinuity and the hexcell grid.

As computational demands can be reduced, a user can perform more interactions with a model and test more modeling hypotheses to generate and assess results.

As an example, a hexcell approach can be augmented using a technique such as octrees. For example, consider a method that includes performing local grid refinement in the form of octrees. Such an approach can allow for a computational structure with quite heterogeneous scales, which may, for example, range from well interpretation which may be of the order of 1 m dimension and seismic data which may be of the order of 50 m or 100 m dimension. While an octree technique may be applied to a tetrahedral grids, computationally, octrees comport with hexahedral grids.

As an example, a method can include partitioning (e.g., splitting) computations, for example, in several sub-grids. In such an example, parallel processing may be employed using two or more processing units such that a large model may be processed in parallel as to spatial domains and/or as to resolution(s) (e.g., consider octree refined regions, which may be at various scales). As an example, a method may employ one or more techniques for different grids adjacent to one another. For example, consider an intermediate two-stage solver.

As to utilization of a hexcell or other type of regular grid structure, seismic data can be provided in the form of a seismic cube that can be defined using a regular grid structure. In such an approach, a seismic data processing workflow may match a seismic cube grid and a model grid where the two grids are regular grids, which may be structured grid or substantially structured grids in contrast to unstructured grids as utilized with tetrahedrons (e.g., grid indexing, etc.). For example, consider a workflow that includes a direct update of a velocity model to account the different insights found while generating a structural model, which may be backpropagated.

Figure 9:
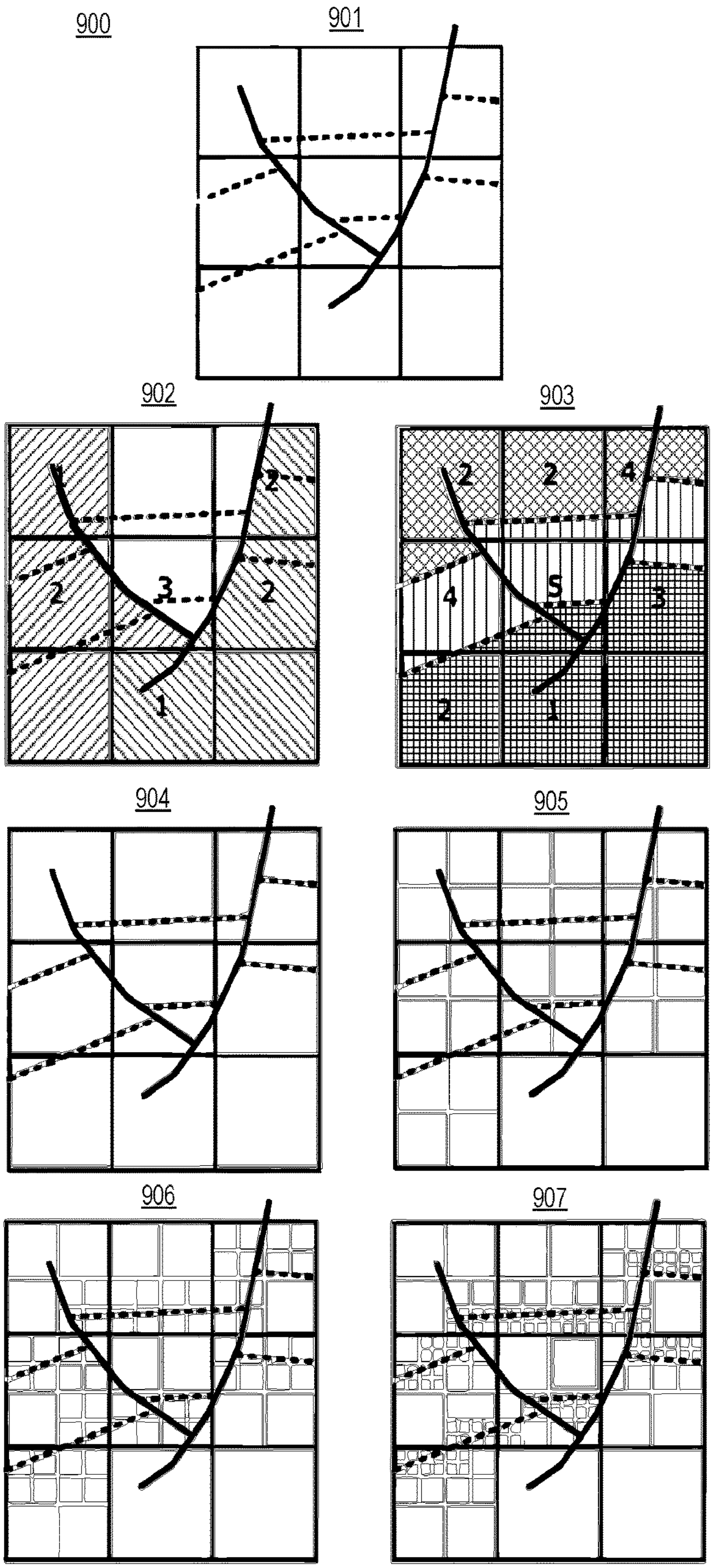
FIG. 9 illustrates an example of a method via graphics.

FIG. 9 shows various representations of a structural model 900 with cut cells where an octree technique can be utilized to refine model representation. In the example of FIG. 9, the model includes stratigraphy showing three stratigraphic layers in the representation 901, as indicated by hatching in the representations 902 and 903. As the locations of interfaces that define the layers may be of interest in making computations as to volumes, assessing fluid accumulations, etc., regions of the interfaces may be refined using an octree approach (e.g., or other tree such as quadtree, etc.), particularly in regions proximate to one or more discontinuities. For example, consider a progression from the representation 904 to the representation 905, followed by a progression to the representation 906 and finally the representation 907. In such an approach, various regions can be readily refined, as appropriate, using a tree-based approach. In various instances, a discontinuity such as a fault can impact physical phenomena such as fluid flow. Where a workflow aims to identify a hydrocarbon reservoir, such refinements may facilitate locating the metes and bounds of an interface, whether with another layer and/or with one or more discontinuities. As explained, a workflow can utilize data such as seismic data to discern and/or more precisely locate a layer boundary, etc.

Figure 10:
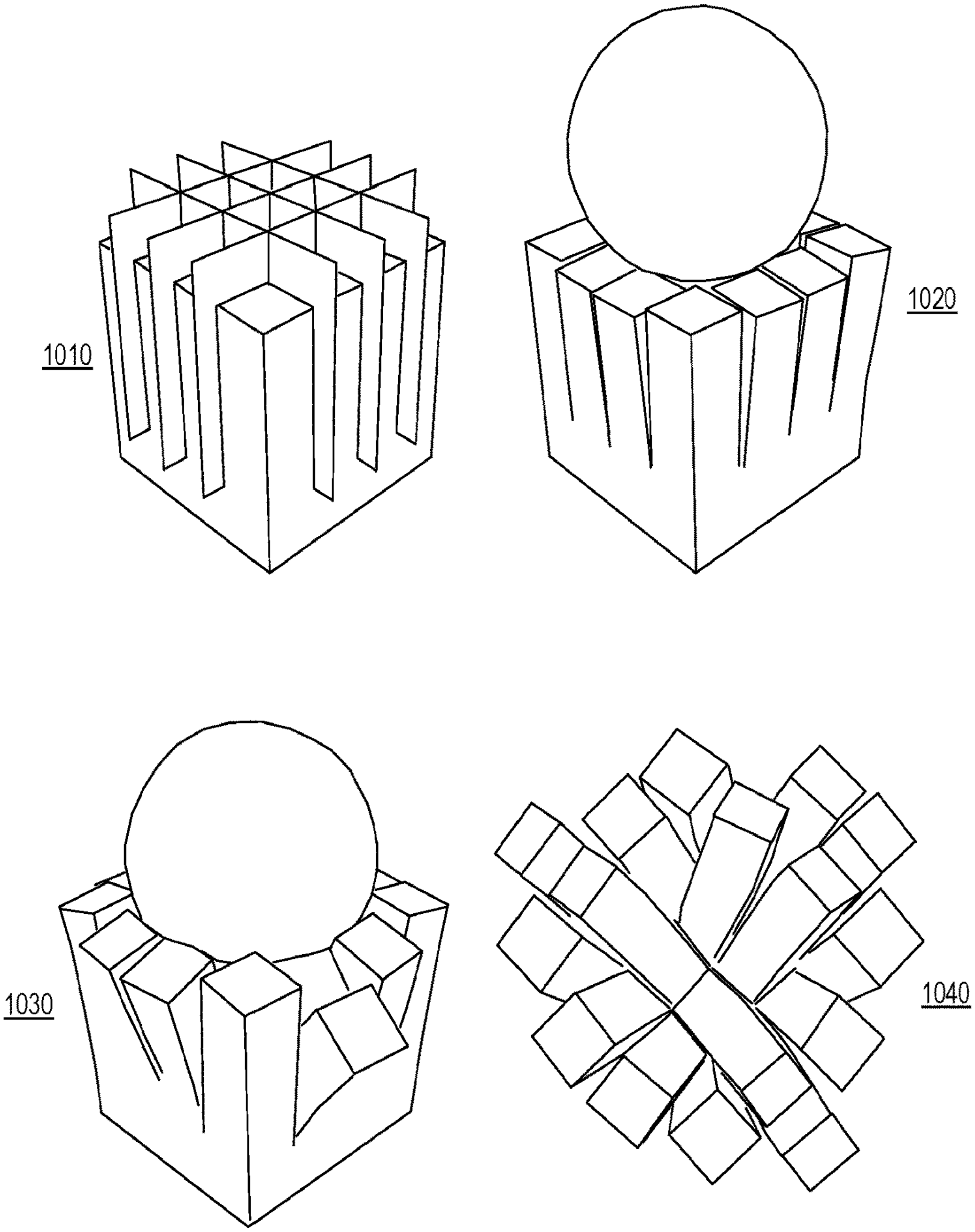
FIG. 10 illustrates an example of a method via graphics.

FIG. 10 shows various representations of mixed types of structures that may be part of a process 1000. For example, consider cutting a domain 1010, placing an object on the cut domain where the object has mass and is influenced by gravity 1020 and then deforming the cut domain due to the physical effect of the object under the influence of gravity 1030. In the example of FIG. 10, the object may be removed where the domain may remain static or, for example, may rebound 1040. In various instances, geologic formations can be columns where an object such as a salt body may form and thereby distort the columns. Hence, the example of FIG. 10 can have an analogy in a geologic environment.

As an example, a workflow may include one or more of computation of velocity models, structural modeling, geomechanics, flow simulation, etc.

Figure 11:
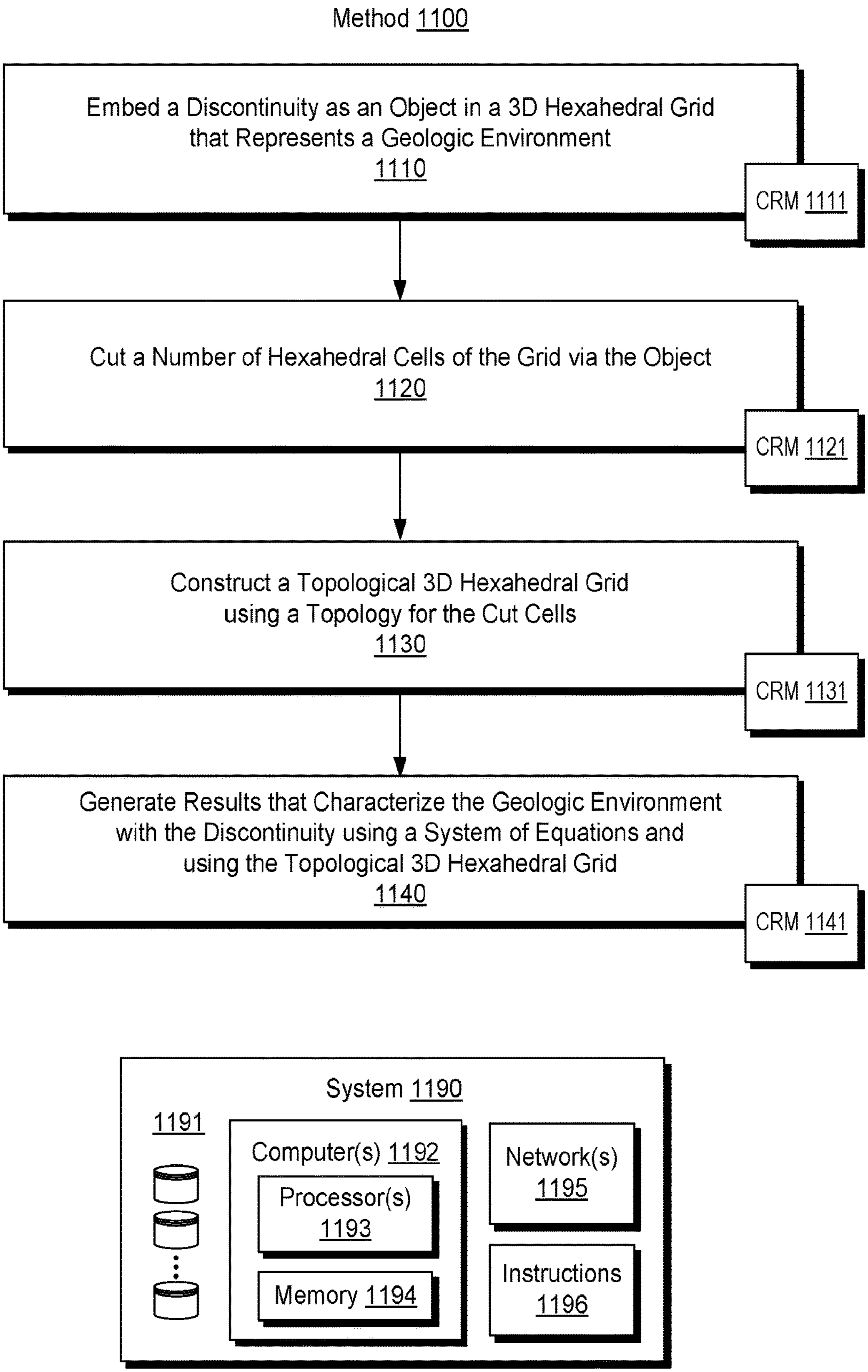
FIG. 11 illustrates an example of a method and an example of a system.

FIG. 11 shows an example of a method 1100 that includes an embed block 1110 for embedding a discontinuity as an object in a three-dimensional hexahedral grid that includes hexahedral cells and represents a geologic environment; a cut block 1120 for cutting a number of the hexahedral cells by intersecting the object and the three-dimensional hexahedral grid to identify cut cells; a construction block 1130 for constructing a topological three-dimensional hexahedral grid using a topology for the cut cells that includes spatially overlapping hexahedral cells and associated cut cell-face links; and a generation block 1140 for generating results that characterize the geologic environment with the discontinuity using a system of equations that represent the geologic environment and using the topological three-dimensional hexahedral grid. In such an example, generating results can include executing a computational framework that can include one or more simulators that can, for example, simulate physical phenomena using physics-based equations such as, for example, systems of equations that can include partial differential equations. In such an example, the geologic environment can be characterized with respect to an ability to produce hydrocarbons from one or more reservoirs in the geologic environment, which can be via one or more wells drilled into the geologic environment that extend to one or more reservoirs. As explained, production can involve injection, which may include water flooding and/or one or more other injection techniques. As an example, stimulation may be utilized such as, for example, hydraulic fracturing where fluid can be injected along with proppant and other materials to generate fractures in a reservoir, which can enhance drainage of hydrocarbons from a reservoir. As an example, a simulation may pertain to acoustic energy, for example, to simulate a seismic survey of a geologic environment, which may aid in interpreting seismic data and/or in planning and/or execution of a seismic survey.

The method 1100 is shown in FIG. 11 in association with various computer-readable media (CRM) blocks 1111, 1121, 1131, and 1141. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1100. As an example, a computer-readable medium (CRM) may be a computer-readable storage medium that is non-transitory and that is not a carrier wave. As an example, one or more of the blocks 1111, 1121, 1131, and 1141 may be in the form processor-executable instructions, for example, consider the one or more sets of instructions 270 of the system 250 of FIG. 2, etc.

In the example of FIG. 11, the system 1190 includes one or more information storage devices 1191, one or more computers 1192, one or more networks 1195, and instructions 1196. As to the one or more computers 1192, each computer may include one or more processors (e.g., or processing cores) 1193 and memory 1194 for storing the instructions 1196, for example, executable by at least one of the one or more processors 1193 (see, e.g., the blocks 1111, 1121, 1131, and 1141). As an example, a computer may include one or more network interfaces (e.g., wired or wireless), one or more graphics cards, a display interface (e.g., wired or wireless), etc.

As an example, a method may include discretizing equations in cut cells directly. For example, consider the block 1130 where the generation of the topological three-dimensional hexahedral grid includes creating additional hexahedral cells that include at least some hexahedral cells with the topology created to account for topology of the cut cells. In such an example, discretization of equations is performed on hexahedral cells. As explained, discretization may be performed in cut cells directly, though such an approach may introduce some additional accounting.

As an example, a method may employ a grid that includes six-face cells that are defined in a cylindrical coordinate system. In such an example, an object may cut the grid to generate cut cells where the cut cells and associated faces can provide for topology information. In such an example, the generation of the cut cells may be handled akin to a hexahedral grid, for example, utilizing one or more spatial transforms (e.g., consider a transform from a hexahedral Cartesian grid to a six-face cell cylindrical grid).

As explained, a method can include generating topology information that can be utilized with a regular grid. In such an example, the regular grid may be refined, for example, using an octree approach while accounting for the topology information.

As explained, different representations may be used for subsurface representation and computation. For example, regular grids (e.g., for seismic inversion and interpretation), pillar grids, stair-step grids and tetrahedral meshes, etc. In various instances, a geologic environment can include one or more discontinuities, which may demand representation in a model to appropriately characterize the geologic environment. A discontinuity may be, for example, a structural feature that is inherent to the geologic environment (e.g., faults, erosions, etc.).

As to the various types of grids, regular grids, and stair-step representations of discontinuities tend to be voxelated (e.g., in 3D), and therefore of limited resolution. As to pillar grids, they can be limited as to configurations of faults; while tetrahedral meshes tend to be computationally demanding (e.g., time consuming) to produce without guarantees as to suitably matching discontinuities.

In various workflows, a domain transition may be performed. For example, consider moving from a seismic domain of a regular grid to a structural domain of a tetrahedral grid. Such transitions complicate workflows, which can demand processes of mapping or/and interpolation from one representation to another.

As explained, a hexahedral approach may be utilized for one or more types of workflows where various types of equations may be solved using a common grid. Such a grid can be flexible and relatively rapid to compute. As explained, a method can include embedding and cutting.

As an example, a hexcell approach may utilize a suite of computational components and data structures that provide for an efficient (e.g., run-time, access, etc.) and memory compact representation of relatively complex subsurface structures. As explained with respect to FIG. 4, tetrahedral representations can be unstructured and inherently complicate computations, especially as a geologic environment becomes more complex. As explained, a 3D representation of space which can include discontinuities (e.g., such as faults or erosions) and can serve as a support for various different types of scientific and numerical computations such as, for example, one or more of stratigraphic function computation, geo-mechanical deformation, flow simulation, and sound wave inversion. As an example, a hexcell approach using a hexcell framework can facilitate workflows and collaboration between workflows. Further, various tools of a framework may be applicable to one or more workflows and hence reduce burden in user transitions from one task to another (e.g., subsurface modeling, simulation, etc.).

As explained, a method can include representations of cut cells, which are the result of intersection of a discontinuity with a regular grid (e.g., Cartesian, cylindrical, etc.). As an example, cutting can generate polyhedral cells which are part of hexahedral cells. Cutting may make a single cell into two or more cells that are polyhedral and/or polygonal cells (e.g., polyhedral in 3D or polygonal in 2D) and represent a new domain of computation which embeds one or more discontinuities.

In terms of a data structure, a structured grid approach is inherently more compact than an unstructured grid approach. In an embed and cut approach, some additional accounting can be provided without introducing overhead equivalent to an unstructured approach. As explained, a framework can include various components to handle one or more of embedding and cutting and/or one or more other actions. A data structure can allow a representation of subsurface structures (e.g., faults, stratigraphic horizons, layers of rocks, etc.) and, for example, enables simulation in the subsurface that takes advantage of a more precise description of the computational domain which embeds one or more discontinuities.

As an example, the DELFI computational environment can include one or more features for a hexcell approach. For example, a hexcell framework may be included that can be interoperable with multiple other frameworks. In such an example, a model may be shared and utilized for one or more workflows, optionally being progressed in one or more aspects to characterize a geologic environment. As an example, a common data structure can allow for faster communication between workflows, removing the annoying step of interpolation from one representation to another.

In various instances, constructing a representation with a hexcell approach can be 10 to 100 times faster than using a tetrahedral mesh. Further, a hexcell approach can represent various types of structures and optionally include local grid refinement (e.g. octree, etc.). Yet further, a hexcell approach can be scalable.

As explained, a hexcell approach can provide versatility in representation of features, a relatively small memory footprint (cut cells are generated on demand, otherwise the representation stays simple with the hexahedral grid), and there can be ease of communication between workflows sharing a common representation.

As an example, a method can include embedding a discontinuity as an object in a three-dimensional hexahedral grid that includes hexahedral cells and represents a geologic environment; cutting a number of the hexahedral cells by intersecting the object and the three-dimensional hexahedral grid to identify cut cells; constructing a topological three-dimensional hexahedral grid using a topology for the cut cells that includes spatially overlapping hexahedral cells and associated cut cell-face links; and generating results that characterize the geologic environment with the discontinuity using a system of equations that represent the geologic environment and using the topological three-dimensional hexahedral grid. In such an example, two of the cut cells can be formed by cutting one of the hexahedral cells by the object, and where the constructing the topological three-dimensional hexahedral grid can include associating one of the overlapping hexahedral cells to one of the two cut cells and another one of the overlapping hexahedral cells to another one of the two cut cells. As an example, the constructing the topological three-dimensional hexahedral grid can include constructing the cut-cell face links according to cut-cell face connections.

As an example, a discontinuity can be a fault. As an example, an object can include a surface mesh. For example, consider a surface mesh that includes a triangle mesh.

As an example, a system of equations can include implicit function equations and where results of a solution to the system of equations can include stratigraphy (e.g., surfaces that represent stratigraphy, etc.).

As an example, a system of equations can include fluid dynamics equations (e.g., Darcy, Navier-Stokes, etc.) where results of a solution can include pressures and/or fluid flow velocities (e.g., streamlines, etc.).

As an example, an object can be a sheet that intersects multiple layers of material in the geologic environment. In such an example, the multiple layers can be spatially offset from one side of the sheet to another, opposite side of the sheet.

As an example, a method can include refining a topological three-dimensional hexahedral grid utilizing octrees.

As an example, a method can include repositioning an object in a three-dimensional hexahedral grid where, for example, repositioning does not re-grid the three-dimensional hexahedral grid.

As an example, a method can include embedding at least one additional discontinuity as at least one additional object in a topological three-dimensional hexahedral grid. In such an example, a method can include identifying a region of the topological three-dimensional hexahedral grid that is between two of the discontinuities and refining the region. In such an example, the method can include refining by utilizing octrees. As an example, a region can include an interface between two different rock layers of a geologic environment.

As an example, a method can include generating an object via at least seismic data. In such an example, generating the object can include interpreting the seismic data to identify the object as a fault. In such an example, a method can include meshing the object using triangles.

As an example, a system can include one or more processors; a memory accessible to at least one of the one or more processors; processor-executable instructions stored in the memory and executable to instruct the system to: embed a discontinuity as an object in a three-dimensional hexahedral grid that includes hexahedral cells and represents a geologic environment; cut a number of the hexahedral cells by intersecting the object and the three-dimensional hexahedral grid to identify cut cells; construct a topological three-dimensional hexahedral grid using a topology for the cut cells that includes spatially overlapping hexahedral cells and associated cut cell-face links; and generate results that characterize the geologic environment with the discontinuity using a system of equations that represent the geologic environment and using the topological three-dimensional hexahedral grid.

As an example, one or more computer-readable storage media can include processor-executable instructions to instruct a computing system to: embed a discontinuity as an object in a three-dimensional hexahedral grid that incudes hexahedral cells and represents a geologic environment; cut a number of the hexahedral cells by intersecting the object and the three-dimensional hexahedral grid to identify cut cells; construct a topological three-dimensional hexahedral grid using a topology for the cut cells that includes spatially overlapping hexahedral cells and associated cut cell-face links; and generate results that characterize the geologic environment with the discontinuity using a system of equations that represent the geologic environment and using the topological three-dimensional hexahedral grid.

As an example, a computer program product can include computer-executable instructions to instruct a computing system to perform one or more methods such as, for example, the method 1100 of FIG. 11, etc.

As an example, a computer program product can include one or more computer-readable storage media that can include processor-executable instructions to instruct a computing system to perform one or more methods and/or one or more portions of a method.

Figure 12:
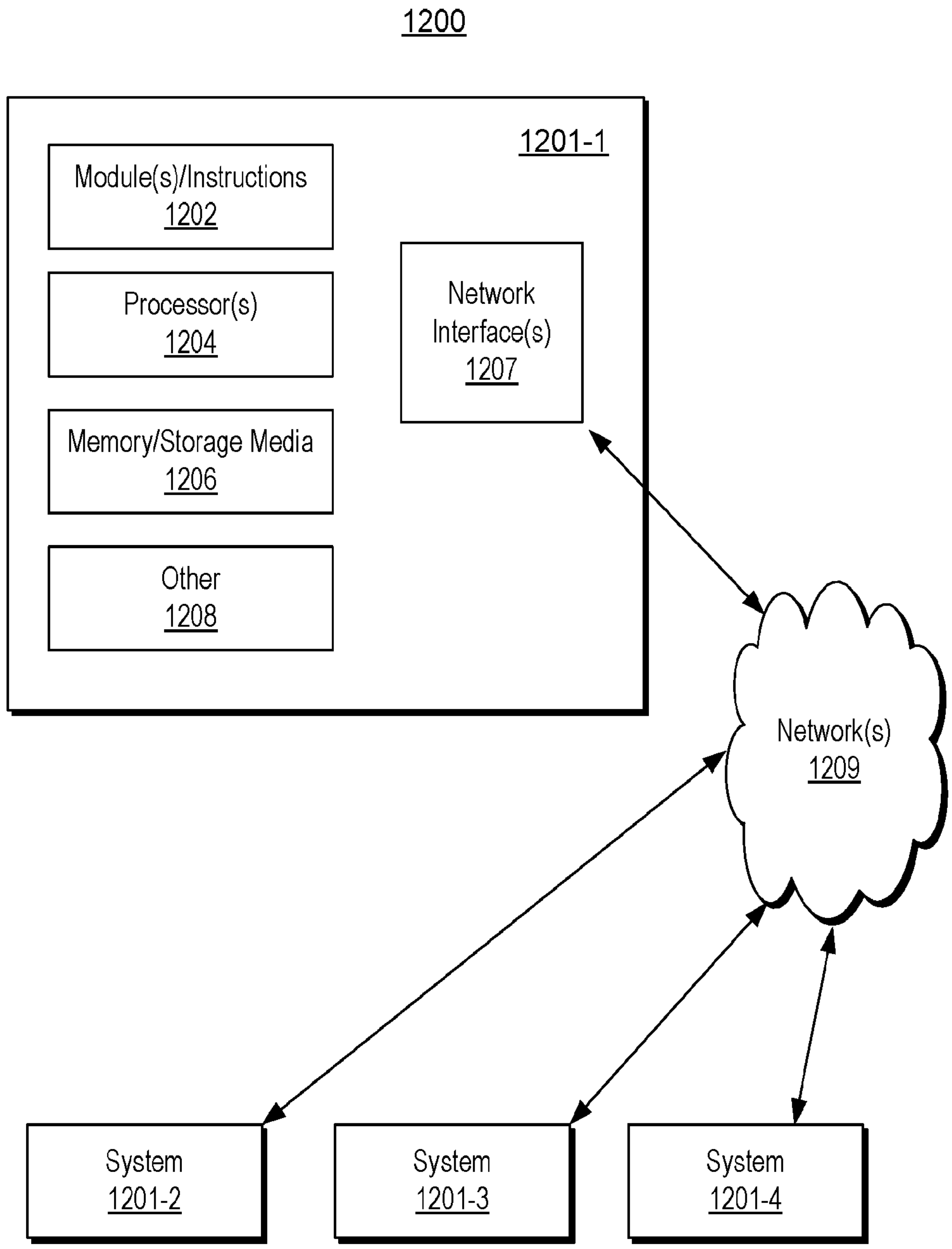
FIG. 12 illustrates examples of computer and network equipment.

In some embodiments, a method or methods may be executed by a computing system. FIG. 12 shows an example of a system 1200 that can include one or more computing systems 1201-1, 1201-2, 1201-3, and 1201-4, which may be operatively coupled via one or more networks 1209, which may include wired and/or wireless networks. As shown, one or more other components 1208 can be included.

As an example, a system can include an individual computer system or an arrangement of distributed computer systems. In the example of FIG. 12, the computer system 1201-1 can include one or more modules 1202, which may be or include processor-executable instructions, for example, executable to perform various tasks (e.g., receiving information, requesting information, processing information, simulation, outputting information, etc.).

As an example, a module may be executed independently, or in coordination with, one or more processors 1204, which is (or are) operatively coupled to one or more storage media 1206 (e.g., via wire, wirelessly, etc.). As an example, one or more of the one or more processors 1204 can be operatively coupled to at least one of one or more network interface 1207. In such an example, the computer system 1201-1 can transmit and/or receive information, for example, via the one or more networks 1209 (e.g., consider one or more of the Internet, a private network, a cellular network, a satellite network, etc.).

As an example, the computer system 1201-1 may receive from and/or transmit information to one or more other devices, which may be or include, for example, one or more of the computer systems 1201-2, etc. A device may be located in a physical location that differs from that of the computer system 1201-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1206 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAS, PLDs, or other appropriate devices.

Figure 13:
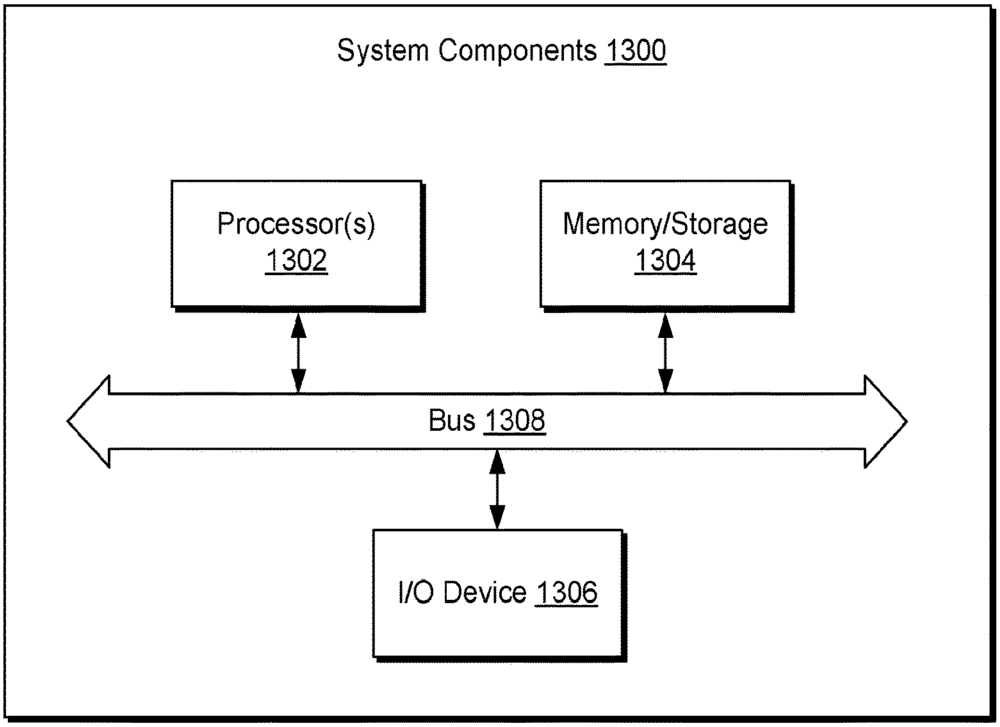
FIG. 13 illustrates example components of a system and a networked system.
Figure 13:
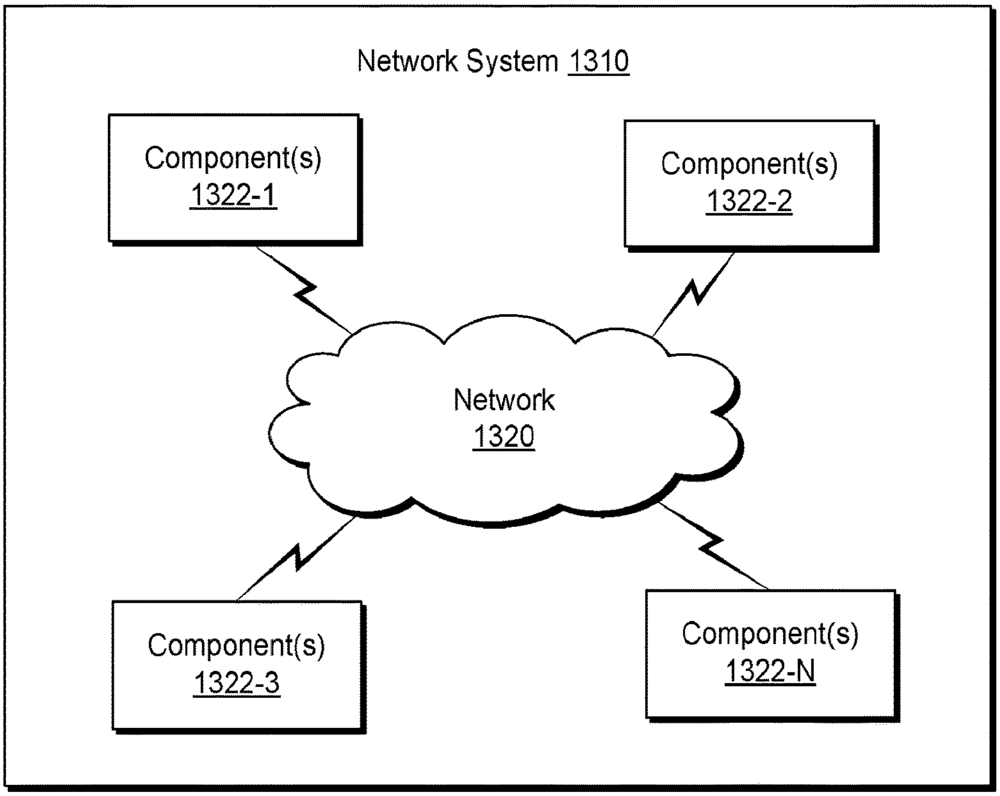

FIG. 13 shows components of an example of a computing system 1300 and an example of a networked system 1310 with a network 1320. The system 1300 includes one or more processors 1302, memory and/or storage components 1304, one or more input and/or output devices 1306 and a bus 1308. In an example embodiment, instructions may be stored in one or more computer-readable media (e.g., memory/storage components 1304). Such instructions may be read by one or more processors (e.g., the processor(s) 1302) via a communication bus (e.g., the bus 1308), which may be wired or wireless. The one or more processors may execute such instructions to implement (wholly or in part) one or more attributes (e.g., as part of a method). A user may view output from and interact with a process via an I/O device (e.g., the device 1306). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1310. The network system 1310 includes components 1322-1, 1322-2, 1322-3, . . . 1322-N. For example, the components 1322-1 may include the processor(s) 1302 while the component(s) 1322-3 may include memory accessible by the processor(s) 1302. Further, the component(s) 1322-2 may include an I/O device for display and optionally interaction with a method. A network 1320 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:

generating an embedding mesh for a discontinuity, wherein generating the embedding mesh includes:

discretizing the discontinuity into a two-dimensional mesh, wherein at least a portion of the discontinuity overlaps on the two-dimensional mesh;

generating duplicate mesh elements of the two-dimensional mesh at overlapping geographic locations of the discontinuity, the duplicate mesh elements having a first side having first properties and a second side having second properties; and connecting the duplicate mesh elements by identifying continuity of the first properties or the second properties between the duplicate mesh elements;

embedding the discontinuity as an object in a three-dimensional hexahedral grid that comprises a plurality of hexahedral cells and represents a geologic environment by embedding the embedding mesh in the three-dimensional hexahedral grid, wherein the embedding mesh includes mesh elements that are smaller than a cross-sectional area of individual hexahedral cells of the plurality of hexahedral cells;

cutting a number of the plurality of hexahedral cells at the duplicate mesh elements by intersecting the object and the three-dimensional hexahedral grid to identify a plurality of cut cells, wherein the plurality of cut cells increase a quantity of the plurality of hexahedral cells by the number;

constructing a topological three-dimensional hexahedral grid using a topology for the plurality of cut cells that comprises spatially overlapping hexahedral cells of the plurality of hexahedral cells and associated cut cell-face links, wherein the associated cut cell-face links are linked using the duplicate mesh elements connected using the continuity of the first properties or the second properties, and wherein the plurality of cut cells occupy the same space as the spatially overlapping hexahedral cells and the associated cut cell face-links identify which faces are shared between the plurality of cut cells; and generating results that characterize the geologic environment with the discontinuity using a system of equations that represent the geologic environment and using the topological three-dimensional hexahedral grid.

2. The method of claim 1, wherein two cut cells of the plurality of cut cells are formed by cutting at least one of the plurality of hexahedral cells by the object, and wherein the constructing the topological three-dimensional hexahedral grid comprises associating one of the spatially overlapping hexahedral cells to one of the two cut cells and another one of the spatially overlapping hexahedral cells to another one of the two cut cells.

3. The method of claim 1, wherein the constructing the topological three-dimensional hexahedral grid comprises constructing the associated cut cell-face links according to cut cell-face connections.

4. The method of claim 1, wherein the discontinuity is a fault.

5. The method of claim 1, wherein the object comprises a surface mesh.

6. The method of claim 5, wherein the surface mesh is different than the three-dimensional hexahedral grid, and wherein embedding the discontinuity includes aligning the surface mesh with the three-dimensional hexahedral grid.

7. The method of claim 1, wherein the system of equations comprises implicit function equations and wherein the results comprise stratigraphy.

8. The method of claim 1, wherein the system of equations comprises fluid dynamics equations and wherein the results comprise fluid flow velocities.

9. The method of claim 1, comprising refining the topological three-dimensional hexahedral grid utilizing octrees.

10. The method of claim 1, comprising repositioning the object in the three-dimensional hexahedral grid, wherein the repositioning does not re-grid the three-dimensional hexahedral grid.

11. The method of claim 1, comprising embedding at least one additional discontinuity as at least one additional object in the topological three-dimensional hexahedral grid.

12. The method of claim 11, comprising identifying a region of the topological three-dimensional hexahedral grid that is between two of the discontinuities and refining the region.

13. The method of claim 12, wherein the refining comprises utilizing octrees.

14. The method of claim 12, wherein the region comprises an interface between two different rock layers of the geologic environment.

15. The method of claim 1, comprising generating the object via seismic data.

16. The method of claim 15, wherein the generating the object comprises interpreting the seismic data to identify the object as a fault.

17. The method of claim 16, comprising meshing the object using triangles.

18. The method of claim 1, wherein generating the embedding mesh includes, where the discontinuity terminates, merging the duplicate mesh elements.

19. A system comprising:

one or more processors;

a memory accessible to at least one of the one or more processors; and processor-executable instructions stored in the memory and executable to instruct the system to:

generate an embedding mesh for a discontinuity, wherein generating the embedding mesh includes:

discretizing the discontinuity into a two-dimensional mesh, wherein at least a portion of the discontinuity overlaps on the two-dimensional mesh;

generating duplicate mesh elements of the two-dimensional mesh at overlapping geographic locations of the discontinuity, the duplicate mesh elements having a first side having first properties and a second side having second properties; and connecting the duplicate mesh elements by identifying continuity of the first properties or the second properties between the duplicate mesh elements;

embed the discontinuity as an object in a three-dimensional hexahedral grid that comprises a plurality of hexahedral cells and represents a geologic environment by embedding the embedding mesh in the three-dimensional hexahedral grid, wherein the embedding mesh includes mesh elements that are smaller than a cross-sectional area of individual hexahedral cells of the plurality of hexahedral cells;

cut a number of the plurality of hexahedral cells at the duplicate mesh elements by intersecting the object and the three-dimensional hexahedral grid to identify a plurality of cut cells, wherein the plurality of cut cells increase a quantity of the plurality of hexahedral cells by the number;

construct a topological three-dimensional hexahedral grid using a topology for the plurality of cut cells that comprises spatially overlapping hexahedral cells of the plurality of hexahedral cells and associated cut cell-face links, wherein the associated cut cell-face links are linked using the duplicate mesh elements connected using the continuity of the first properties or the second properties, and wherein the plurality of cut cells occupy the same space as the spatially overlapping hexahedral cells and the associated cut cell face-links identify which faces are shared between the plurality of cut cells; and generate results that characterize the geologic environment with the discontinuity using a system of equations that represent the geologic environment and using the topological three-dimensional hexahedral grid.

20. One or more non-transitory computer-readable storage media comprising processor-executable instructions to instruct a computing system to:

generate an embedding mesh for a discontinuity, wherein generating the embedding mesh includes:

discretizing the discontinuity into a two-dimensional mesh, wherein at least a portion of the discontinuity overlaps on the two-dimensional mesh;

generating duplicate mesh elements of the two-dimensional mesh at overlapping geographic locations of the discontinuity, the duplicate mesh elements having a first side having first properties and a second side having second properties;

connecting the duplicate mesh elements by identifying continuity of the first properties or the second properties between the duplicate mesh elements; and where the discontinuity terminates, merging the duplicate mesh elements;

embed the discontinuity as an object in a three-dimensional hexahedral grid that comprises a plurality of hexahedral cells and represents a geologic environment by embedding the embedding mesh in the three-dimensional hexahedral grid, wherein the embedding mesh includes mesh elements that are smaller than a cross-sectional area of individual hexahedral cells of the plurality of hexahedral cells;

cut a number of the plurality of hexahedral cells at the duplicate mesh elements by intersecting the object and the three-dimensional hexahedral grid to identify a plurality of cut cells, wherein the plurality of cut cells increase a quantity of the plurality of hexahedral cells by the number;

construct a topological three-dimensional hexahedral grid using a topology for the plurality of cut cells that comprises spatially overlapping hexahedral cells of the plurality of hexahedral cells and associated cut cell-face links, wherein the associated cut cell-face links are linked using the duplicate mesh elements connected using the continuity of the first properties or the second properties, and wherein the plurality of cut cells occupy the same space as the spatially overlapping hexahedral cells and the associated cut cell face-links identify which faces are shared between the plurality of cut cells; and generate results that characterize the geologic environment with the discontinuity using a system of equations that represent the geologic environment and using the topological three-dimensional hexahedral grid.

* * * * *